United States Patent
Johnson et al.

(10) Patent No.: US 9,536,290 B2
(45) Date of Patent: Jan. 3, 2017

(54) TEMPERED AUTO-ADJUSTING, IMAGE-EDITING OPERATION

(71) Applicant: Apple Inc., Cupertino, CA (US)

(72) Inventors: Garrett M. Johnson, San Francisco, CA (US); Russell Y. Webb, San Jose, CA (US)

(73) Assignee: APPLE INC., Cupertino, CA (US)

( * ) Notice: Subject to any disclaimer, the term of this patent is extended or adjusted under 35 U.S.C. 154(b) by 657 days.

(21) Appl. No.: 13/629,504

(22) Filed: Sep. 27, 2012

(65) Prior Publication Data

US 2013/0332866 A1 Dec. 12, 2013

Related U.S. Application Data

(60) Provisional application No. 61/657,794, filed on Jun. 10, 2012.

(51) Int. Cl.
*G06K 9/00* (2006.01)
*G06T 5/00* (2006.01)
(Continued)

(52) U.S. Cl.
CPC ............... *G06T 5/009* (2013.01); *G06T 5/40* (2013.01); *H04N 5/232* (2013.01); *G06T 2200/24* (2013.01); *G06T 2207/10024* (2013.01)

(58) Field of Classification Search
None
See application file for complete search history.

(56) References Cited

U.S. PATENT DOCUMENTS

| 5,581,370 A | 12/1996 | Fuss et al. |
| 5,874,988 A * | 2/1999 | Gu ..................... H04N 9/74 348/97 |

(Continued)

FOREIGN PATENT DOCUMENTS

| EP | 1302898 | 4/2003 |
| EP | 1761040 | 3/2007 |

(Continued)

OTHER PUBLICATIONS

Invitation to Pay Additional Fees and, Where Applicable, Protest Fee for PCT/US2013/042948, Dec. 9, 2013 (mailing date), Apple Inc.

(Continued)

*Primary Examiner* — Weiwen Yang
(74) *Attorney, Agent, or Firm* — Adeli LLP

(57) ABSTRACT

Some embodiments provide a novel method for tempering an adjustment of an image to account for prior adjustments to the image. The adjustment in some embodiments is an automatic exposure adjustment. The method performs an operation for a first adjustment on a first set of parameters (e.g., saturation, sharpness, luminance). The method compares the first set of parameters to a second set of parameters to produce a third set of parameters that expresses the difference between the first adjustment and a second adjustment. The method performs a third operation to produce an adjusted image. The first set of parameters quantify a set of prior adjustments to the image by an image capturing device when the image was captured in some embodiments. The second set of parameters is a set of target parameters. The third set of parameters specify the tempered adjustment of the image.

24 Claims, 17 Drawing Sheets

(51) Int. Cl.
  *H04N 5/232*  (2006.01)
  *G06T 5/40*   (2006.01)

(56) References Cited

U.S. PATENT DOCUMENTS

| | | |
|---|---|---|
| 6,594,388 B1 | 7/2003 | Gindele et al. |
| 6,940,545 B1 | 9/2005 | Ray et al. |
| 7,421,120 B2 | 9/2008 | Kang |
| 7,532,234 B2 | 5/2009 | Sadovsky et al. |
| 7,586,653 B2 | 9/2009 | Pulsifer |
| 7,599,093 B2 | 10/2009 | Kagaya |
| 7,894,668 B1 | 2/2011 | Boitano |
| 8,044,978 B2 | 10/2011 | Na |
| 8,159,617 B2 | 4/2012 | Neal |
| 8,170,337 B2 | 5/2012 | Miyazawa |
| 8,184,904 B2 | 5/2012 | Kodavalla et al. |
| 8,224,039 B2 | 7/2012 | Ionita et al. |
| 8,355,059 B2 | 1/2013 | Fukui |
| 8,374,430 B2 | 2/2013 | Hsu |
| 8,606,037 B2 | 12/2013 | Ali |
| 8,644,638 B2 | 2/2014 | Demandolx |
| 2003/0012437 A1* | 1/2003 | Zaklika et al. ............... 382/169 |
| 2006/0245017 A1 | 11/2006 | Aoki et al. |
| 2006/0267923 A1 | 11/2006 | Kerofsky |
| 2007/0030506 A1 | 2/2007 | Takabayashi et al. |
| 2008/0123952 A1 | 5/2008 | Parkkinen et al. |
| 2010/0002104 A1 | 1/2010 | On et al. |
| 2010/0034458 A1 | 2/2010 | Tada |
| 2010/0315517 A1* | 12/2010 | Nakamura et al. ...... 348/207.99 |
| 2011/0129148 A1 | 6/2011 | Kisilev et al. |
| 2012/0219218 A1* | 8/2012 | Demandolx .................. 382/168 |
| 2012/0229681 A1* | 9/2012 | Ansfield ................ G06T 5/008 348/241 |
| 2013/0329994 A1 | 12/2013 | Webb et al. |

FOREIGN PATENT DOCUMENTS

| | | |
|---|---|---|
| EP | 2372638 | 10/2011 |
| WO | WO 2013/188099 | 12/2013 |

OTHER PUBLICATIONS

International Search Report and Written Opinion for PCT/US2013/042948, Mar. 7, 2014 (mailing date), Apple Inc.

Lin, Ping-Hsien, et al., "Tri-Histogram Equalization Based on First Order Statistics," The 13$^{th}$ IEEE International Symposium on Consumer Electronics (ISCE2009), May 2009, pp. 387-391, Pistacaway, New Jersey, USA.

Pratt, William K., "Image Enhancement," Digital Image Processing: PIKS Inside, Third Edition, Jan. 2001, pp. 243-296, John Wiley & Sons, Inc., New York, USA.

* cited by examiner

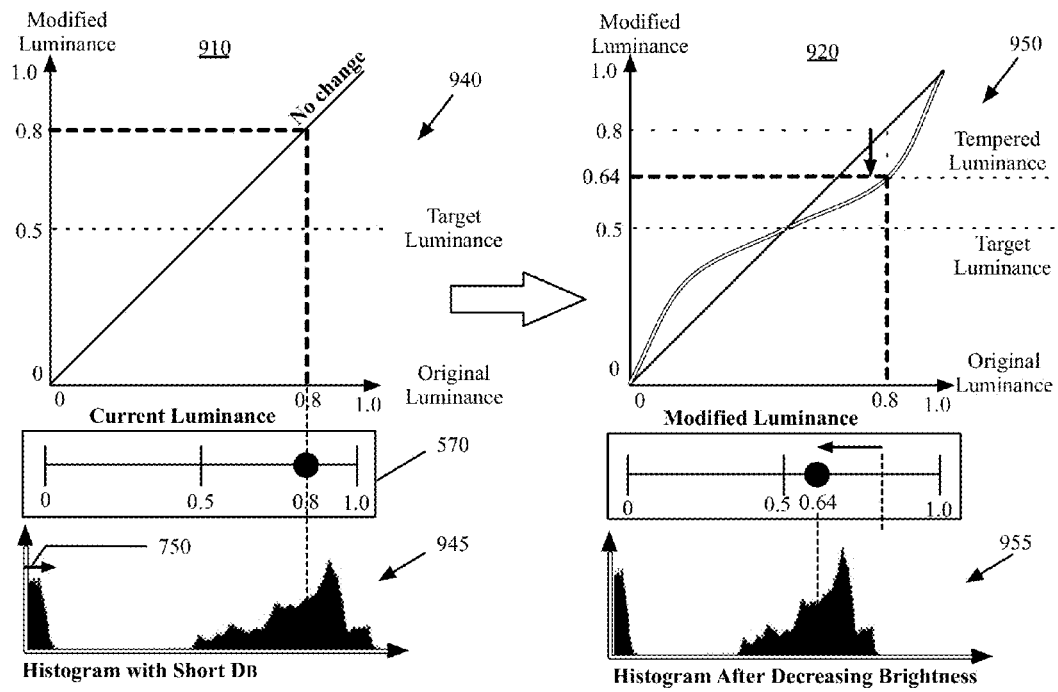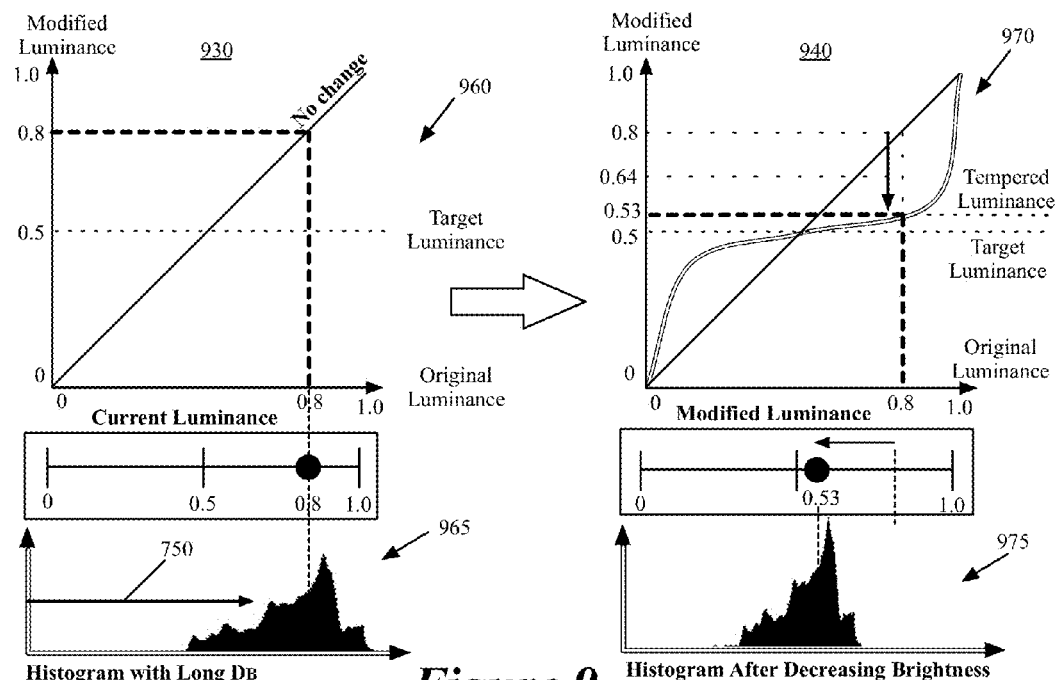
Figure 9

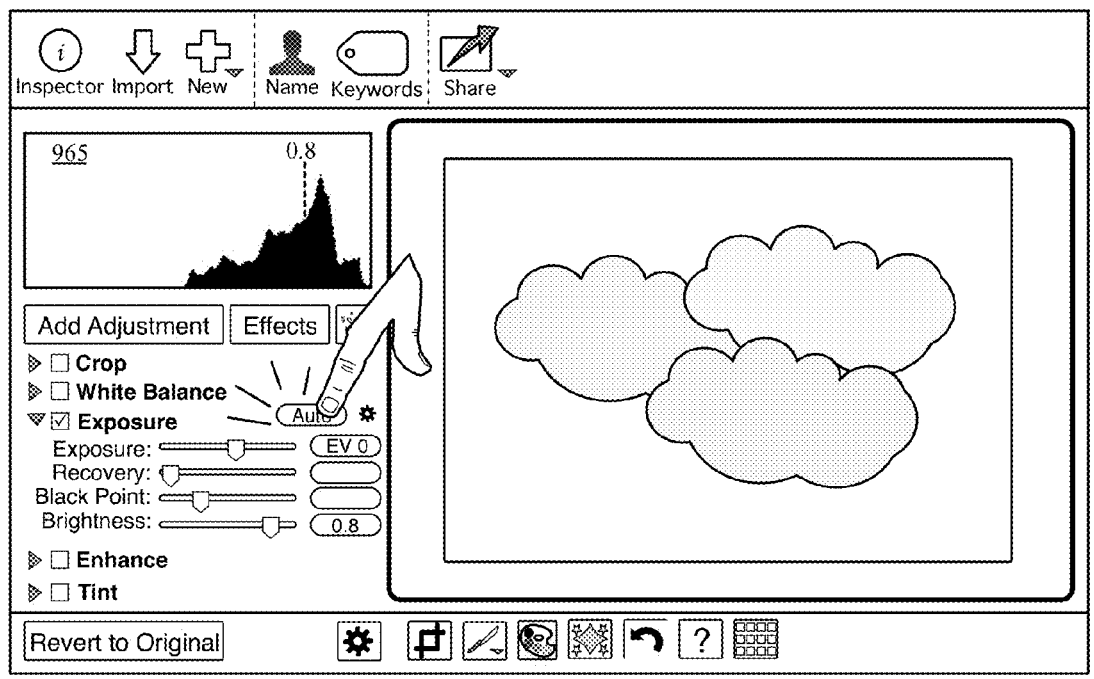
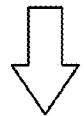
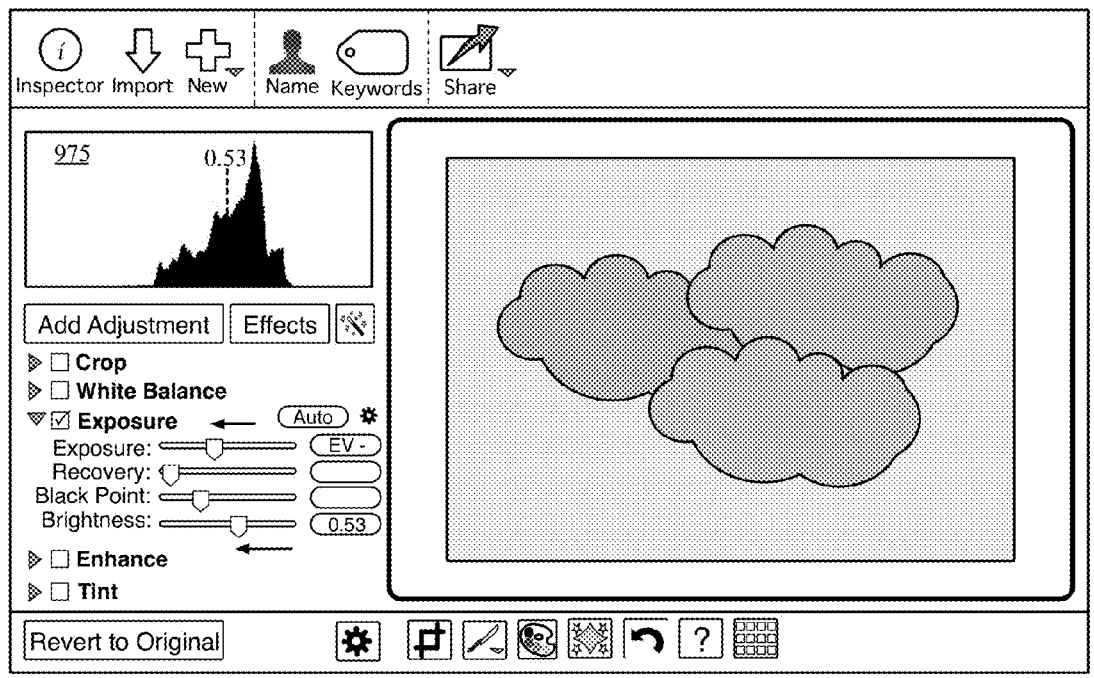
*Figure 11*

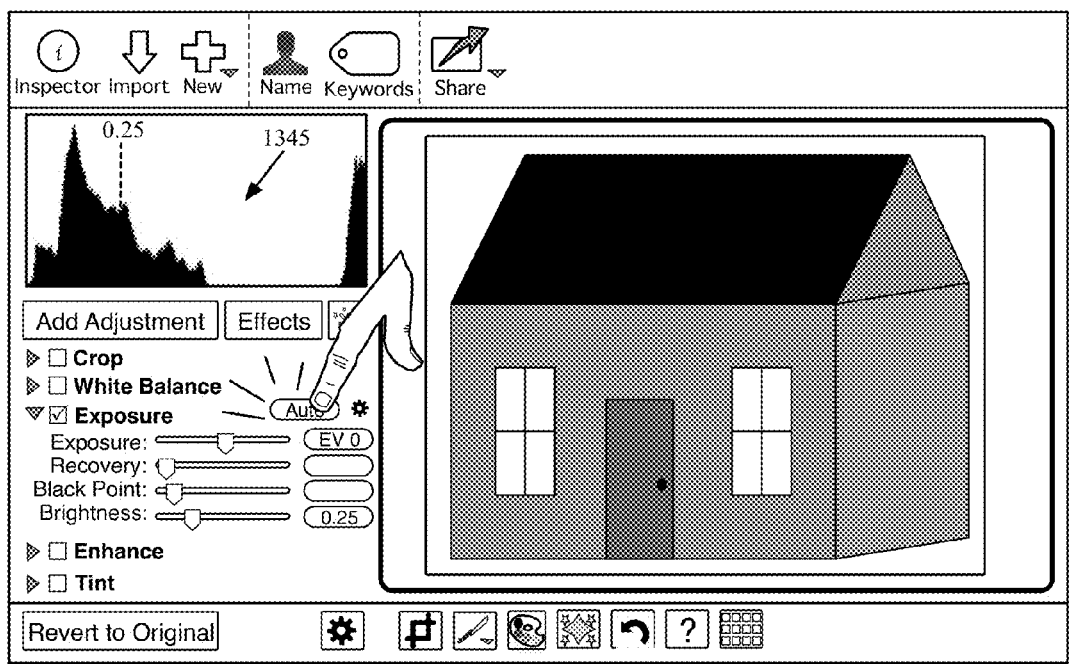
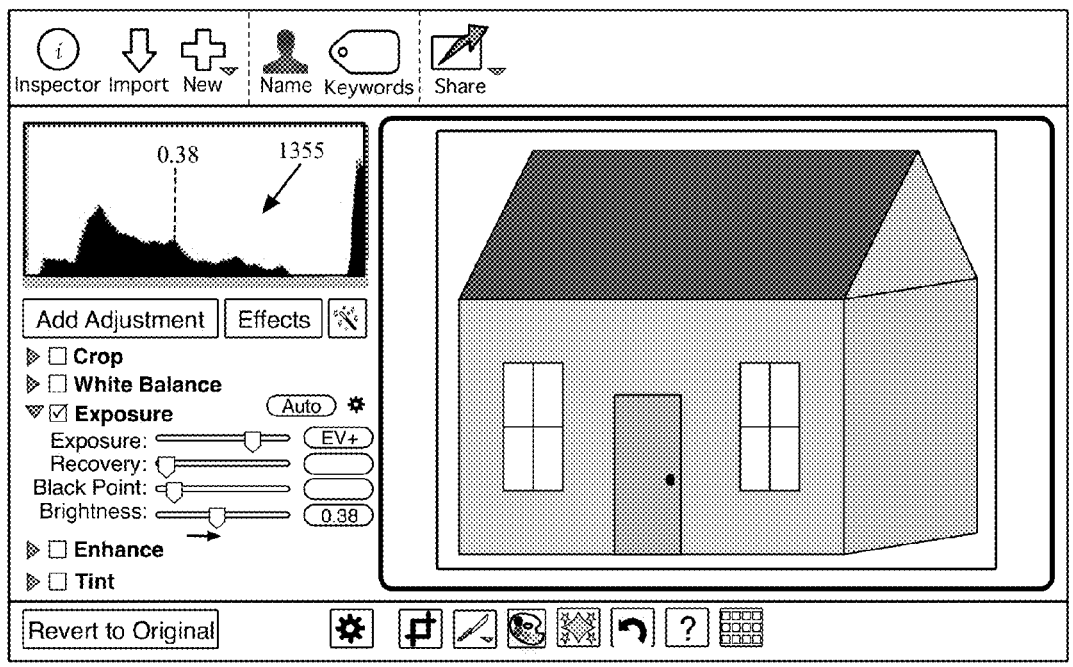
*Figure 13*

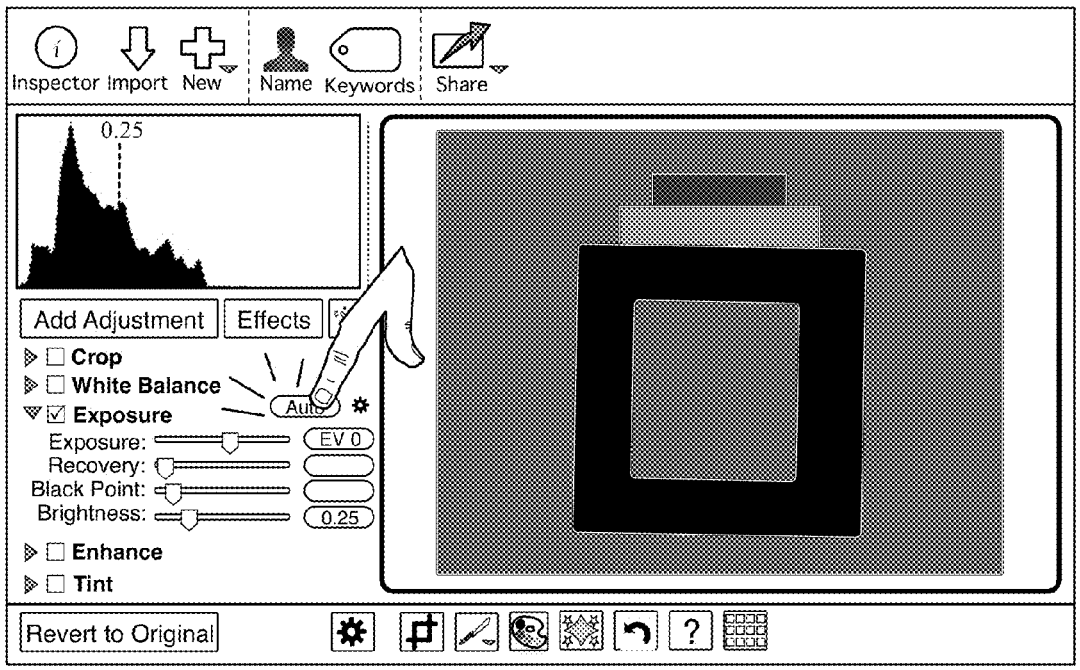
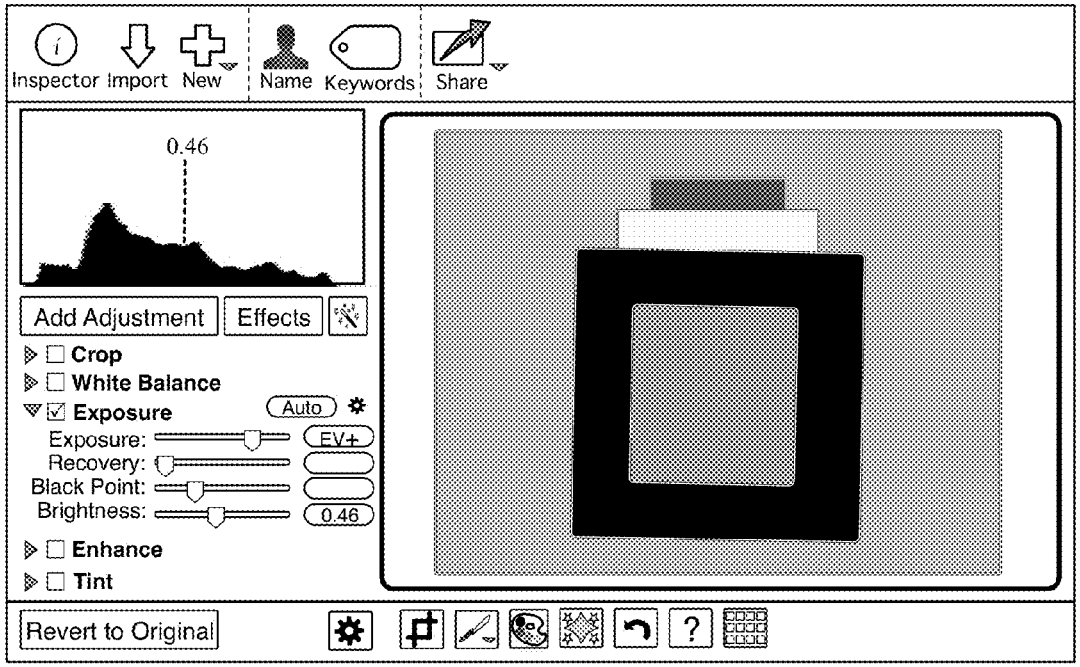
*Figure 14*

TEMPERED AUTO-ADJUSTING, IMAGE-EDITING OPERATION

CLAIM OF BENEFIT TO PRIOR APPLICATIONS

This application claims benefit to U.S. Provisional Patent Application 61/657,794, entitled "Tempered Auto-adjusting, Image-editing Operation," filed Jun. 10, 2012. The U.S. Provisional Patent Application 61/657,794 is incorporated herein by reference.

BACKGROUND

Digital graphic design and media editing applications (hereafter collectively referred to as image editing applications or media editing applications) provide graphical designers, media artists, and other users with the necessary tools to view and edit an image. Examples of such applications include Aperture®, Final Cut Pro®, iMovie®, and iPhoto®, all sold by Apple, Inc. These applications give users the ability to edit images in a variety of manners. For example, some applications provide different range sliders for adjusting different properties of an image or a video.

Many media editing applications, however, do not provide automatic image adjustment controls. For example, a user is required to manually adjust different sliders or enter values for different image properties in order to effectively use most of the existing image adjustment tools. This requires the user to have extensive knowledge of the values and slider positions for making different image adjustments. Unless the user knows precise values or slider positions for making image adjustments, the user is forced to try different values or slider positions until the adjustments are accurate. Even a user with such extensive knowledge may not have precise values or slider positions readily available when the user is making image adjustments. Furthermore, the user is left to verifying the accuracy of the adjustment by simply eye-balling the image after the adjustment. These deficiencies cause unnecessary inconvenience in editing an image.

BRIEF SUMMARY

A media editing application of some embodiments performs a novel automatic exposure adjustment of an image. The automatic exposure adjustment in some embodiments multiplies color component or luminance values (e.g., RGB or one or more values in a YCC color space) of pixels in the image by some multiplier value to produce new image exposure values. In some embodiments, the new values are capped at a maximum color component or luminance value. The application uses a method to determine the multiplier value used to multiply the color component values. In some embodiments, the method computes a histogram based on a set of luminance values of the image and identifies a distance to a particular point in the histogram in order to identify the multiplier value for adjusting the luminance of the image.

The method of some embodiments identifies a multiplier value that will darken the image based on a distance to black in the histogram. A distance to black in some embodiments is a distance from the darkest possible black to some low percentile of pixel luminance (among the darker pixels) in the image. Similarly, some embodiments identify a multiplier value that will brighten the image based on a distance to white in the histogram. A distance to white in some embodiments is a distance from the brightest possible white to some high percentile of pixel luminance (among the brighter pixels) in the image.

Some embodiments provide a device that stores a media editing application having a graphical user interface (GUI) for automatically adjusting a set of image parameters of an image displayed in a preview display area of the GUI and modifying the appearance of the displayed image based on the set of adjusted parameters. In some embodiments, the media editing application automatically adjusts the set of image parameters in response to a user input to adjust the set of parameters for the displayed image.

Some embodiments adjust exposure of an image based on a tempered exposure value identified based on an input exposure value of the received image and a target exposure value. The target exposure value is pre-determined in some embodiments.

Some embodiments provide a method for tempering an adjustment of an image to account for prior adjustments to the image. The adjustment in some embodiments is an automatic exposure adjustment. In some embodiments, the method adjusts an image received by a media editing application. The method compares a set of existing parameters to a different set of parameters. Based on the comparison, the method performs an operation to adjust the image.

In some embodiments, the method performs a set of post-processing operations for a first set of adjustments on a first set of parameters (e.g., color saturation, image sharpness, average luminance) of the image received by the media editing application. The first set of parameters of the received image quantify a set of prior adjustments to the image before the image is received by the media editing application. The set of prior adjustments are adjustments that were performed by an image capturing device when the image was captured in some embodiments.

The method compares the first set of parameters to a second set of parameters to produce a third set of parameters that expresses the difference between the first set of adjustments and a second set of adjustments. The second set of parameters is a set of target or desired parameters in some embodiments. The method performs a third operation based on the third set of parameters to produce an adjusted image. In some embodiments, the third set of parameters are between the first and second sets of parameters, allowing the third operation to temper the image adjustment by moderately adjusting the first set of existing parameters toward the second set of desired parameters.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 9 illustrates different image histograms having the same average computed luminance but different tempering curves for decreasing image luminance based on different distances to black of some embodiments.

FIG. 11 illustrates another example of a GUI for adjusting image luminance when the tempering curve is based on a long distance to black.

FIG. 13 illustrates an example of a GUI for adjusting the luminance of an image when the tempering curve is based on a short distance to white.

FIG. 14 illustrates an example of a GUI for adjusting the luminance of an image when the tempering curve is based on a long distance to white.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
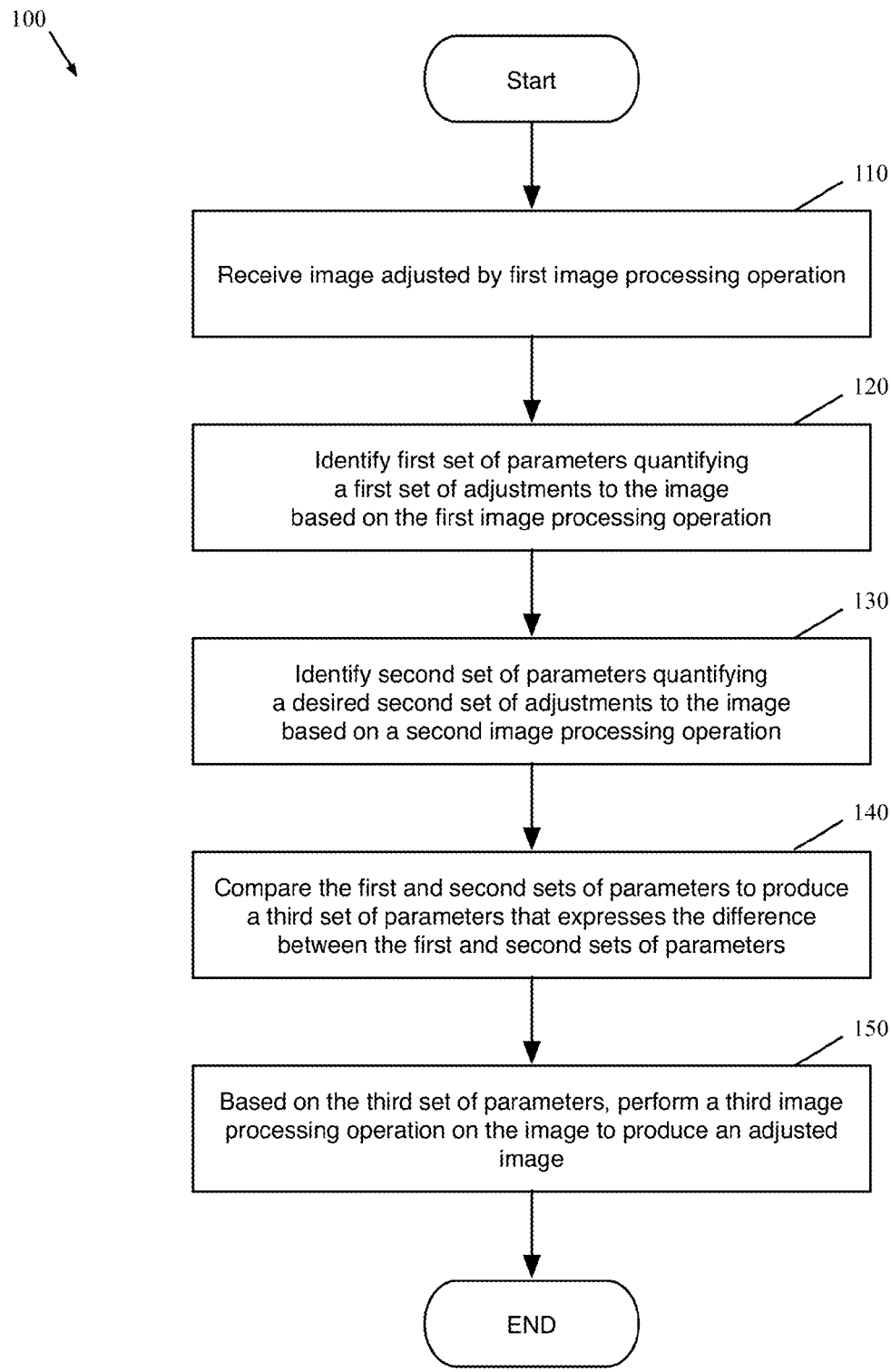
FIG. 1 conceptually illustrates a process of some embodiments that performs an automatic image adjustment operation that tempers the adjustment to account for prior adjustments to the image.

Some embodiments of the invention provide an image-editing process that performs an auto-adjustment operation that automatically adjusts an image but tempers its adjustment to account for prior adjustments to the image. FIG. 1 conceptually illustrates this process for some embodiments of the invention. The process 100 of this figure is performed by a media editing application in some embodiments. In some embodiments, this media editing application executes on top of the operating system of a device (e.g., a computer, a camera, a smartphone, etc.), while in other embodiments it is part of the device's operating system.

The process 100 of some embodiments begins by receiving (at 110) an image that has been adjusted by a first image processing operation. In some embodiments, the received image has been processed prior to the media editing application receiving the image. For example, the image may have been originally generated by an image-capturing device (i.e., a camera) that processed the image based on data that it captured from a scene (i.e., the light captured from the scene).

Next, the process 100 identifies (at 120) a first set of parameters that quantifies a first set of adjustments to the image based on the first image processing operation. In some embodiments, the image has been processed multiple times prior to the media editing application receiving the image (e.g., during image capture and then during an import process into the media editing application). In this example, therefore, any processing of the image prior to the media editing application receiving the image may be treated as the first image processing operation, and the first set of adjustments are those adjustments made to the image as received. However, in some embodiments, the first image processing operation is an image adjustment operation that an image capturing device (e.g., a camera) performs when it captures the image, and this operation is based on data that the camera detected in the scene as it was capturing the image. In some embodiments, the first set of adjustments is a set of image adjustments (e.g., color processing adjustments, white balance adjustments, brightness adjustments, other tonal adjustments, etc.).

After the first set of adjustments is quantified, the process 100 identifies (at 130) a second set of parameters that quantify a desired second set of adjustments to the image based on a second image processing operation. To obtain the second set of parameters, the process 100 performs the second image processing operation on the image in some embodiments. In other embodiments, however, the process 100 identifies the second set of parameters without performing the second image processing operation on the image. For instance, in some embodiments, the second set of parameters is a set of target parameters toward which the first set of parameters are to be adjusted. The set of target parameters includes pre-specified parameter(s), derived parameter(s) computed for the image, or both.

Next, the process 100 compares (at 140) the first and second sets of parameters to produce a third set of parameters that expresses the difference between the first and second sets of parameters. Based on the third set of parameters produced by comparing the first and second sets of parameters, the process 100 performs (at 150) a third image processing operation on the image to produce an adjusted image. After producing the adjusted image by performing the third image processing operation, the process 100 ends.

In some embodiments, the process 100 is used to adjust images that have been previously adjusted by an image-capturing device (e.g., a camera) at the time that the device captured the image. Specifically, image-capturing devices estimate exposure for all non-manual photos taken to automatically expose photos "correctly". Typically, such a device takes into account many factors related to the sensor, the environment, and the scene to determine settings for one or more of the following to achieve correct exposure: ISO, shutter speed, aperture, flash. However, some photos are still under or over exposed, sometimes due to unusual scenes, sometimes as a result of sensor limitations, and sometimes because of user error.

For such cases, the process 100 can adjust an image's attributes (e.g., exposure, white-point, focus, etc.) either as a post-processing operation that is performed after exporting the image from the image-capturing device, or as a secondary operation that the image-capturing device performs on-board. The process's image editing operation in some embodiments can be characterized as follows. In this explanation, Primary refers to the image processing operation performed by the device, while Secondary refers to the subsequent, tempered image processing operation performed by the process 100. The tempered image processing operation is tempered from an operation that would adjust the image to meet a pre-set target (e.g., a target average luminance of the pixels). In some embodiments, the process 100 computes a Delta, which expresses the difference between the effect of the target adjustment and the effect of the Primary (e.g., Delta=Target_Effect−Primary_Effect). To express these effects, the process 100 identifies a set of attributes in the images that result from the Primary and Target operations. In the case of exposure, the set of attributes includes the average luminance value in some embodiments, as further described below. After computing the Delta, the process computes a fraction (between 0 and 1) of the Delta based on a set of criteria that provides a measure of confidence in the effect of the Target operation with respect to the effect of the Primary operation. The fraction is computed, in some embodiments, to moderate the effect of the Target operation to produce the secondary operation. For instance, a small Delta value may indicate a considerable amount of confidence that performing the Target operation on the image's attributes will correctly adjust the image's attributes. In contrast, a large Delta value may indicate only a slight amount of confidence that performing the Target operation on the image will correctly adjust the attributes. Thus, the fraction can be computed so that of the effect of the Secondary operation is mitigated either to a greater extent or to a lesser extent based on the measure of confidence indicated by the Delta value. After computing the fraction, the process selects the set of parameters for the Secondary operation to achieve this fractional adjustment to the image. In some embodiments, the process selects the set of parameters for the Secondary operation to achieve the fractional adjustment based on an assumption that the adjustment (e.g., exposure correction) performed by the image-capturing device was useful since it had several data points about the scene at the time the image was captured. In the example of exposure correction, the set of parameters for the Secondary operation may include the computed Delta and a pre-defined target luminance value, as further described below in Section III.

Figure 2:
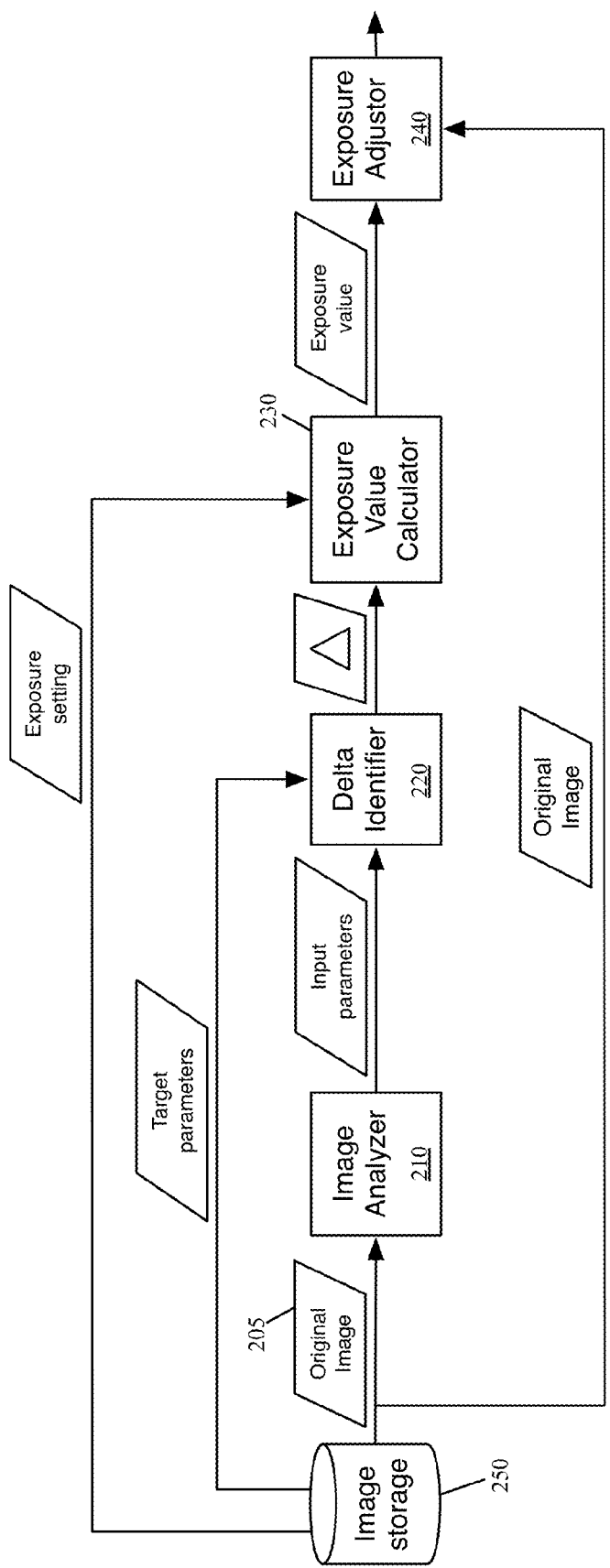
FIG. 2 illustrates a process pipeline that makes a fractional adjustment to a computed Delta value to adjust the exposure of a captured image in some embodiments of the invention.

FIG. 2 illustrates how the process 100 makes a fractional adjustment to a computed Delta value to adjust the exposure of a captured image in some embodiments of the invention. The image processing pipeline in this figure includes an image analyzer 210, a delta identifier 220, an exposure value calculator 230, and an exposure adjustor 240. The image analyzer 210 receives an image 205 from a storage 250. It computes a set of parameters (e.g., an average luminance value) that quantifies a set of characteristics of the image.

The image analyzer 210 then provides this computed set of parameters to the delta identifier 220. The delta identifier 220 also receives a target set of parameters (e.g., a target average luminance value) from the storage. The delta identifier 220 then computes a fractional delta value based on the difference between the computed set of parameters and the received target set of parameters.

The delta identifier 220 then supplies the fractional delta value to the exposure value calculator 230. The exposure value calculator 230 then computes an exposure value based on the received delta value. For instance, as further described below, the exposure value calculator 230 receives a fractional delta value that expresses a tempered, target average luminance value in some embodiments. From this received value, the exposure value calculator computes an exposure value and passes the computed exposure value to the exposure adjustor 240. In some embodiments, the computed exposure value is used to set a control (e.g., a slider control) for adjusting the exposure of the image. The exposure adjustor 240 uses the computed exposure value to adjust the exposure of the retrieved image to achieve the desired tempered target value (e.g., the desired, tempered average luminance value).

Several more detailed embodiments are described below. Section I describes an implementation of an exposure slider control for adjusting exposure of images in a media editing application. Section II describes in an implementation of an exposure slider control that automatically adjusts image intensity based on delta computations. Next, Section III describes several examples of using different curves based on different distances to black and/or white to temper the luminance adjustments to an image. Described in Section IV is the software architecture of the media editing application that uses the exposure slider control of some embodiments. Lastly, Section V describes a computer system that implements some embodiments of the invention.

I. Exposure Slider Control

The exposure of an image depends on many factors. For instance, an image capturing device that captures an image of a scene may estimate exposure based on image parameters such as ISO, shutter speed, aperture, and flash. However, due to various circumstances (e.g., an unusual scene, camera sensor limitations, user error, etc.) the exposure estimation may result in an image that is underexposed or overexposed. In these cases, it may be desirable to adjust exposure. In some embodiments, the exposure of an image can be modified by adjusting one or more parameters of the image.

Figure 3:
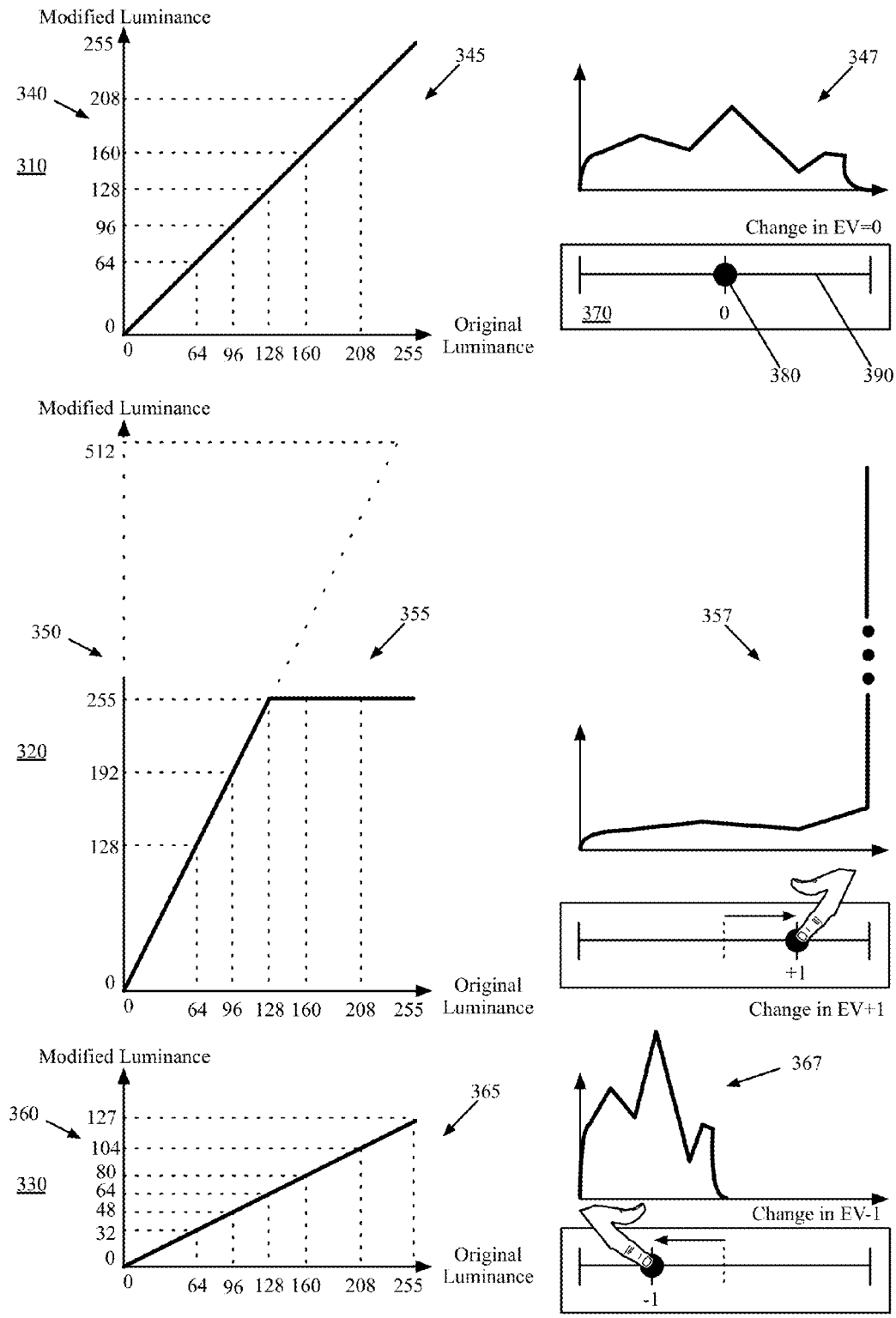
FIG. 3 conceptually illustrates a slider control for modifying parameters of an image of some embodiments.

FIG. 3 conceptually illustrates a slider control 370 for modifying one or more parameters of an image. A user moves this slider control 370 to select different multiplier values to modify the parameters of the image differently. FIG. 3 illustrates the operation of the slider control 370 in terms of three stages (310-330) in which a user moves a slider knob 380 to different positions along a slider track 390 that are associated with different multiplier values. At each stage in this figure, different response graphs 340, 350, and 360 are shown alongside histograms 347, 357, and 367, respectively.

Each histogram represents a set of tonal values of an image. In some embodiments, the histogram represents the image by plotting each pixel of the image to a tonal value. For instance, an image having a set of pixels may have a first sub-set of pixels with a first tonal value, a second sub-set of pixels with a second tonal value, and a third sub-set of pixels with a third tonal value. The histogram may chart first, second, and third positions along the x-axis for the first, second, and third tonal values, respectively. Then, along the y-axis, the histogram may illustrate the frequency or number of pixels at each tonal value. Based on the plotted pixel values, a curve is formed (or conceptualized) that illustrates the distribution of tonal values for the image. For example, at each of the three x-axis positions, a line or a bar that may be displayed along the y-axis of the histogram to represent the number (or frequency) of pixels having the corresponding tonal value along the x-axis.

In some embodiments, the histograms are brightness histograms for an image. A brightness histogram is a histogram of a brightness attribute, such as luminance or luma component color value, of the image. The brightness histogram of the image represents an approximation of the brightness of a scene captured or received by an image capturing device (e.g., a camera). Such a brightness histogram illustrates a range of different image pixel values having different amounts of brightness. For instance, different image capturing devices can approximate the range of brightness of the captured scene differently. In some embodiments, the brightness histogram spans the full dynamic range of all possible tonal values for the image. Within the full dynamic range, an exposure range of the image is represented by the set of brightness values along the x-axis having one or more plotted image pixels. As shown in FIG. 3, each of the histograms 347, 357, and 367 represents the dynamic range and the exposure range of brightness for the set of tonal values for the image.

In order to plot the image's pixels on the histogram, in some embodiments, tonal values of the pixels are determined by performing calculations based on one or more pixel component color values. In some embodiments, an RGB sum is performed to determine the histogram value for a particular pixel. In other words, the brightness histogram is expressed in terms of the sum of the RGB values. In other embodiments, the pixel values are received in the RGB space, converted to a color space that has luminance or luma as one of the component color channels (e.g., YCbCr, YUV, YIQ, etc.), and the brightness histogram is constructed from the luminance or luma values. Yet other embodiments construct other types of histograms to express the range of brightness and tonal variations of the image.

In some embodiments, an overall intensity of the image is determined based on the tonal values of the image's pixels. In some embodiments, the overall intensity of the image is based on the average brightness of the pixel values of the image. In other embodiments, the overall intensity of the image is based on the brightness value of the median pixel in the distribution of pixels of the histogram. The median pixel in the distribution of pixels of the histogram is the median pixel of all the pixels of the image sequentially ordered. In some embodiments, an exposure value (EV) represents the overall intensity of the image. The EV can be indicated by a number of "stops" or "f stops". The overall intensity of the image in some of these embodiments is modified based on changes to the EV. In some of these embodiments, the EV for a number of stops (N) is determined from a base-2 logarithmic scale or calculation, as shown in the equation:

$$EV = \log_2(N) \quad (1)$$

In these embodiments, linear changes to the EV (+1 stop, +2 stops, −1 stop, −2 stops, etc.) result in exponential changes to the overall brightness of the image. For instance, increasing the exposure of the image by one stop (EV+1) doubles the average brightness of the image (e.g., the brightness value of each image pixel is multiplied by two). Similarly, decreasing the exposure by a single stop (EV−1) halves the average brightness of the image (e.g., the brightness value of each image pixel is divided by two).

The exposure slider control 370, in some embodiments, associates a set of positions along the slider track 390 to a set values (e.g., a set of f stop values) for modifying the exposure parameters (e.g., luminance values) of an image. The positions of the slider control 370 are associated, in some embodiments, with pre-determined values along an EV scale (e.g., −3, −2, . . . , 3). An initial setting of the slider knob 380 for an original image is at a default position (e.g., zero position) along the slider track 390 that is associated with no change (e.g., EV0). The other slider control 370 positions represent relative changes in the EV of an image. In some embodiments, when the user moves the slider knob 380 to the left, the original image exposure parameters (e.g., luminance values) are modified (e.g., reduced) based on the multiplier associated with the position selected along the track 390 of the slider control 370. Likewise, when the user moves the slider knob 380 to the right, the original image parameters (e.g., luminance values) are modified (e.g., increased) based on the multiplier value that is associated with the user selected position on the track of the slider control 370.

In some embodiments, slider knob 380 movements between different positions are dynamically captured along the slider track 390 for modifying the exposure parameters (e.g., luminance values) between static EV positions associated with pre-determined values. For example, movements of the slider knob 380 along the portion of the slider track 390 between EV0 and EV+1 may be identified to change the exposure of the image in unison with the movement of the slider knob 380 (e.g., exposure modifications occur approximately simultaneously with movements of the slider knob). In these embodiments, the multipliers associated with the slider knob 380 positions can be decimal or fractional values (e.g., 2.5 or 5/2) that are continuously captured for changing image exposure as the user moves the slider knob 380 along the slider track 390.

The response graphs, 340, 350, and 360, illustrate the effect of a user's movement of the slider knob 380 along the track of the slider control 370 to select a multiplier value. As shown, each response graph 340, 350, and 360 includes a response curve, 345, 355, and 365, respectively. The response curves indicate changes in the parameters of the image when a selected multiplier is applied to the parameter values. For example, a set of exposure values that represent original luminance values of an image (i.e., luminance values exposure adjustments via the slider control 370) can be modified when a user moves the slider knob 380 to a position that is associated with a multiplier value for adjusting the exposure of the image. In FIG. 3, a set of exposure values (e.g., luminance values) is illustrated along the x-axis of each response graph, 340, 350, and 360. Also shown along the y-axis of the response graphs, 340, 350, and 360, are different sets of brightness values (e.g., luminance values) that represent the modified brightness values of the images.

Based on the multiplier value selected for adjusting the brightness of an image, a slope for the adjustment response curve is determined. The slope represents the magnitude of change for the brightness parameters of the image. Likewise, the slope of the response curve indicates the value of the multiplier for modifying the brightness parameters of the image. In some embodiments, where there is no change to the brightness parameters of the image, the response curve is a straight line having a slope of one (i.e., a 45° line with respect to the x-axis and y-axis). In these embodiments, all of the input brightness parameter values (e.g., luminance values) are mapped to the same output brightness parameter values. However, when the image's brightness is changed, the adjustment response curve is reformulated to map the input brightness (e.g., luminance) parameter values to the corresponding output brightness parameter values according to the response curve slope. In some embodiments, the input brightness parameters correspond to the output brightness parameters based on the selected multiplier specified by the position of the slider knob 380.

The first stage 310 of FIG. 3 shows the slider control 370 with an initial setting of zero (i.e., the slider knob 380 is at the zero position). In some embodiments, the initial setting is not associated with any change in the image exposure parameters. The overall image is represented at this stage 310 by the histogram 347, which charts the distribution of pixel values for the image. As there is no change in the position of the slider knob 380 at this stage 310, the response curve 345 is shown at a 45° angle (i.e., slope m=1) in the response graph 340.

The second stage 320 shows that the user moves the slider knob 380 one stop (i.e., EV+1) along the track 390 of the slider control 370. In this example, the slider knob 380 position is associated with a multiplier value of two based on the specified EV+1 change value. Applying the selected multiplier value to the image doubles the image parameters (e.g., twice as much luminance). To perform this doubling operation, in some embodiments, the value of each image pixel in the histogram 347 is doubled. This results in a higher average pixel luminance value. In some embodiments, when a pixel value is increased to more than a maximum allowed value (e.g., a limiting value of a display device or a limiting value of an image format), the pixel's value is capped at the maximum value. In other embodiments, the image pixel value is allowed to double when the value is increased beyond the maximum value. However, in these embodiments, the pixel may be displayed (e.g., on a display screen) at the maximum exposure value for the image (e.g., the brightest white), while retaining (e.g., in a data structure storing data of the image) a logical value beyond the maximum allowed value.

The histogram 357 illustrates the effect of doubling the pixel luminance values. In this case, the doubling of the pixel luminance values causes a substantial shift in the distribution of pixels to the right of the histogram. As shown, the number of pixels represented on the right side of the histogram 357 is substantially more than the number of pixels on the right side of the histogram 347 (i.e., before applying the selected multiplier value). In particular, a large spike is shown at the far right (i.e., the white edge) of the histogram 357. This large spike illustrates the shift in pixel values to the right and the capping of the pixel values that exceed the limiting value (e.g., 255). Likewise, the number of pixel values on the left side of the histogram 357 is substantially less than the number of pixel values on the left side of the histogram 347. As the histograms 347 and 357 chart the relative brightness of the pixel luminance values from left to right (i.e., darkest to lightest), the shift in pixels shown between these histograms 347 and 357 indicates the increase in overall luminance for the image.

The response curve 355 at this stage 320 also illustrates the effect of doubling the pixel luminance values. As shown in the response graph 350, the slope of the response curve 355 has increased from one, in the response curve 345, to two. Thus, each input value shown along the x-axis of the response graph 350 is mapped to an output value (y-axis) that is twice the input value. Although the y-axis is conceptually illustrated as having values to 512, the actual brightness values get capped, in this example, at a limiting value associated with the image (e.g., limit of 255). In other embodiments, the values beyond the maximum are retained but are limited in the display of the image. For example, an 8-bit JPEG image may be limited to values in the range of 0-255, while a 12-bit RAW image may support values well beyond 255. As the slope of the response curve 355 at this stage 320 is two, the output values of several input pixel values (i.e., input pixel values from 0 to 127) are less than the limiting value. As shown in the response curve 355, the values are doubled. As each input value in the response curve 355 is doubled to the corresponding output value, the overall brightness of the image would theoretically double. However, the output values of several input pixel values (i.e., input pixel values from 128 to 255) exceed the limiting value. These output values are capped at 255, as shown in the response curve 355. Thus, several pixels having different image pixel values before the multiplier value is selected by the slider control 370 are capped at the maximum value. In some embodiments, such doubling and capping results in a loss of image detail or information (e.g., relative luminance differences are lost).

In other embodiments, the maximum allowed value only represents a maximum allowed value for displaying the image. In these embodiments, the values would increase, but the visible display of pixels having values that exceed the maximum allowed value would be limited to the maximum. For instance, pixel values of 128 are doubled to 256 and pixel values of 255 are doubled to 510. The output values (256 and 510), however, exceed the maximum allowed value for displaying the image in this example. Thus, several pixels having different values before the multiplier value is selected by the slider control 370 are increased to values that exceed the maximum allowed value, but the visible display of those pixels is limited to the maximum allowed value. In these embodiments, the display of the capped pixels could result in a loss of visible image detail or information, even though the pixel values beyond the maximum allowed value are retained.

The third stage 330 shows that the user moves the slider knob 380 to the left to select a multiplier value of ½ based on an EV−1 change specified by the new position of the slider knob 380. The multiplier selected in this case is a fraction, which when applied to image pixel values, causes reductive changes in value (e.g., reduces luminance values to half their original values). To perform this exposure reduction operation, in some embodiments, the value of each image pixel in the histogram 347 is halved (resulting in histogram 367). As shown in the response graph 360, the slope of the response curve 365 has decreased from one (i.e., in the slope of the response curve 345) to ½ based on the selected EV−1 value associated with the multiplier value of ½. Thus, when the selected multiplier value (½) is applied to the image, the luminance values are reduced by half.

To perform this reduction operation, which results in a lower average luminance value for the image, the luminance value of each pixel in the histogram 347 is halved. The histogram 367 illustrates the effect of halving the pixel luminance values. In this case, the halving of the image pixel values has caused a substantial shift in the distribution of pixels to the left side of the histogram. As shown, the number of pixels represented on the left side of the histogram 367 is substantially more than the number of pixels represented on the left side of the histogram 347 (i.e., before applying the multiplier). Furthermore, all of the pixel luminance values on the right side of the histogram 347 have shifted to the left side in histogram 367, so that no pixels are represented on the right half of the histogram 367. As the vast majority of pixels have been redistributed from the right (e.g., brighter luminance) to the left (e.g., darker luminance) of the histogram, the average image pixel value (e.g., overall exposure) has decreased.

Also, the response curve 360 illustrates the effect of reducing the pixel luminance values by half. In particular, each input value, as shown along the x-axis of the response graph 360, is mapped to an output value that is half the input value at this stage 330. As shown in this example, pixel luminance values of 64 are halved to 32, pixel luminance values of 96 are halved to 48, pixel luminance values of 128 are halved to 64, pixel luminance values of 160 are halved to 80, and pixel luminance values of 208 are halved to 104. Furthermore, none of the input pixel luminance values are output to luminance values of 128 or more.

In the examples described above, and further described below, the data calculations are shown as whole number (i.e., integer) calculations. However, in some embodiments, some or all data calculations and computations are made with floating point values. In these cases, the image adjustments are based on floating point computations that are more precise (e.g., no round-off loss of data within a series of cumulative calculations) than computations based on integer values. In some cases, visual image detail is preserved by treating all values (i.e., integer and decimal values alike) as floating point values in order to perform any calculations or computations for making image adjustments.

Figure 4:
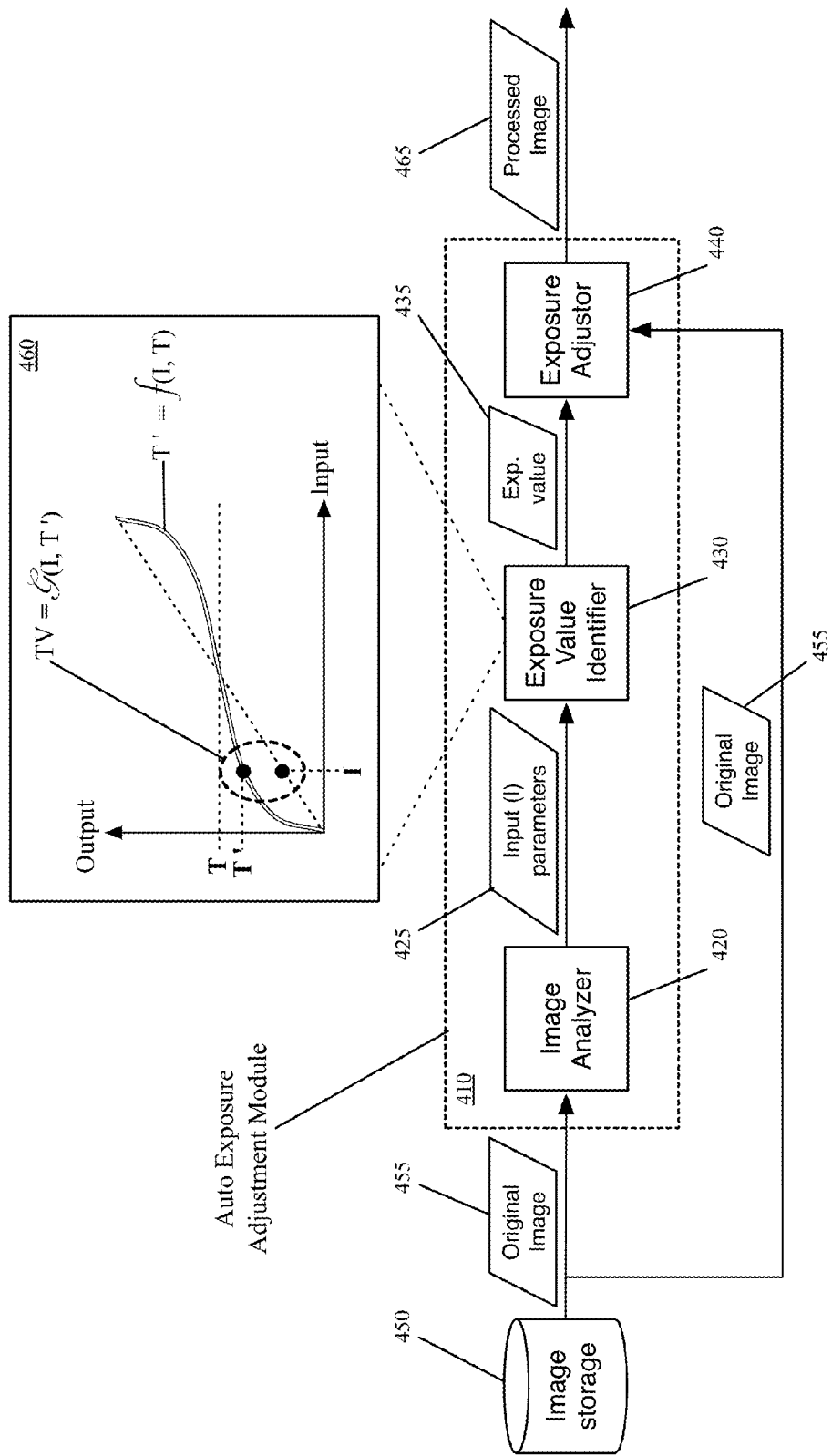
FIG. 4 conceptually illustrates an auto exposure adjustment module that automatically identifies an exposure value of an image using a function that computes a tempered target intensity for the image.

While the user's selection of a slider position (e.g., f stop value) along the slider track 390 of the slider control 370, as described for FIG. 3, causes the exposure intensity of the image to be modified according to the multiplier value associated with the selected slider position, in other cases, exposure values are automatically identified. In some embodiments, an exposure enhancement process uses a function to automatically identify the exposure value. FIG. 4, which is described by reference to FIGS. 5 and 6, conceptually illustrates an auto exposure adjustment module that performs such an exposure enhancement process by using a function to automatically identify the exposure value.

II. Delta Computation for Auto Intensity Adjustments

In some embodiments, image intensity is quantified according to tonal values of the image's pixels. For example, the average computed brightness of the image can be identified, in some cases, by the mean brightness value of all the pixel brightness values of the image. In other cases, the average computed brightness can be identified by the median brightness value in a histogram for the image. In some cases, however, we want to change the intensity (e.g., average computed brightness or luminance) to a target intensity. The target intensity can be different intensity values in different embodiments (e.g., a 50% brightness value, 18% brightness value, etc.). As the identified intensity of an image may be determined to be more or less intense than the desired level of intensity for the image, adjustments are needed to match the target intensity. However, in some cases, adjusting the identified intensity to match the target intensity could result in unintended image distortion or other consequences. For example, a target intensity that cranks up the brightness of the image in order to correctly expose a set of under-exposed image elements (e.g., faces of people in a background portion of the image) may inadvertently over-expose another set of well-exposed image elements (e.g., faces of people near the image foreground). Thus, in some embodiments, the difference (also known as the "delta") between the current intensity value for the image and the desired intensity is determined. Intensity adjustments are then tempered or moderated based on the calculated delta, in order to adjust the intensity to some level between a full adjustment (i.e., adjusting intensity all the way to the target intensity) and no change to the intensity (i.e., retaining the input intensity of the image without any adjustment). The following section describes such an approach that compromises between a full adjustment and no adjustment. In some embodiments, a tempered adjustment is identified by using a function which, based on the calculated delta, automatically computes an exposure value that is associated with a multiplier value for adjusting image intensity.

FIG. 4 conceptually illustrates an auto exposure adjustment module 410 that automatically identifies the exposure value using a function that computes a tempered target intensity based on the set of input image parameters and a target intensity for the image. In some embodiments, the auto exposure adjustment module 410 is a user-selectable tool which when selected identifies an exposure value 435 for performing an auto adjustment operation on the received image. The auto exposure adjustment module 410 identifies the exposure value 435 by computing a tempered intensity value based on a computed intensity parameter of the received image and a target intensity value for the image. The operation of the auto exposure adjustment module 410 is described below by reference to FIGS. 5 and 6, which conceptually illustrate four examples of computed tempered intensity values for four different images.

As shown in FIG. 4, the auto exposure adjustment tool 410 includes an image analyzer 420, an exposure value identifier 430, and an exposure adjustor 440. In some embodiments, the image analyzer 420 analyzes one or more parameters of an original image 455 to identify the intensity value of the image.

In some embodiments, the computed intensity parameter is a luminance value that expresses an average luminance for a set of pixels of the original image 455. Different embodiments compute the average intensity parameter differently. Examples of such computed average intensity parameters include median, mean, average, or any other measure of central tendency in a distribution of values.

As shown in FIG. 4, the image analyzer 420 retrieves the image to analyze from an image storage 450. The image storage 450, in some embodiments, is a storage of an image editing application. In some of these embodiments, images that are imported into the image editing application are stored in the image storage 450. In some embodiments, the image storage 450 is a storage of a device (e.g., a digital camera) that is used to capture the image.

As further shown in FIG. 4, the image analyzer 420 provides the average intensity value that it computed for the retrieved image to the exposure value identifier 430. The exposure value identifier 430, in some embodiments, identifies the exposure value 435 by computing a tempered intensity value based on the average intensity value and the target intensity value.

In some embodiments, the tempered intensity value is a solution for modifying the average intensity value of the original image 455 to generate a tempered target intensity (T' as shown in the breakout box 460) for the image. For example, the tempered intensity value is a solution for modifying the original average intensity value that is short of matching the target intensity value. In some embodiments, the tempered intensity value is calculated to optimize the average intensity value for the image. In some of these embodiments, the exposure value identifier 430 identifies a tempered target intensity (T' as shown in the breakout box 460) and then computes the tempered intensity value (TV, as shown in the breakout box 460) based on the tempered target intensity. In some other embodiments, the exposure value identifier 430 identifies the tempered target intensity (T') and then retrieves the tempered intensity value from a storage (e.g., a lookup table, a database, etc.) based on the tempered target intensity.

The exposure value identifier 430, as shown in FIG. 4, also provides the identified exposure value 435 to the exposure adjustor 440. In some embodiments, the exposure adjustor 440 receives the exposure value 435 from the exposure value identifier 430 in order to adjust the exposure intensity of the original image 455 based on the exposure value. In some embodiments, the exposure adjustor 440 retrieves the original image 455 from the image storage 450. In some of these embodiments, the exposure adjustor 440 retrieves the original image 455 when it receives the exposure value 435 from the exposure value identifier 430. In some other embodiments, the exposure adjustor 440 retrieves the original image 455 at approximately the same time as when the image analyzer 420 retrieves the original image 455. Based on the exposure value, the exposure adjustor 440 adjusts the exposure intensity of the image to generate a processed image 465. In some embodiments, the exposure adjustor 440 outputs the processed image 465 to one or more other modules.

Figure 5:
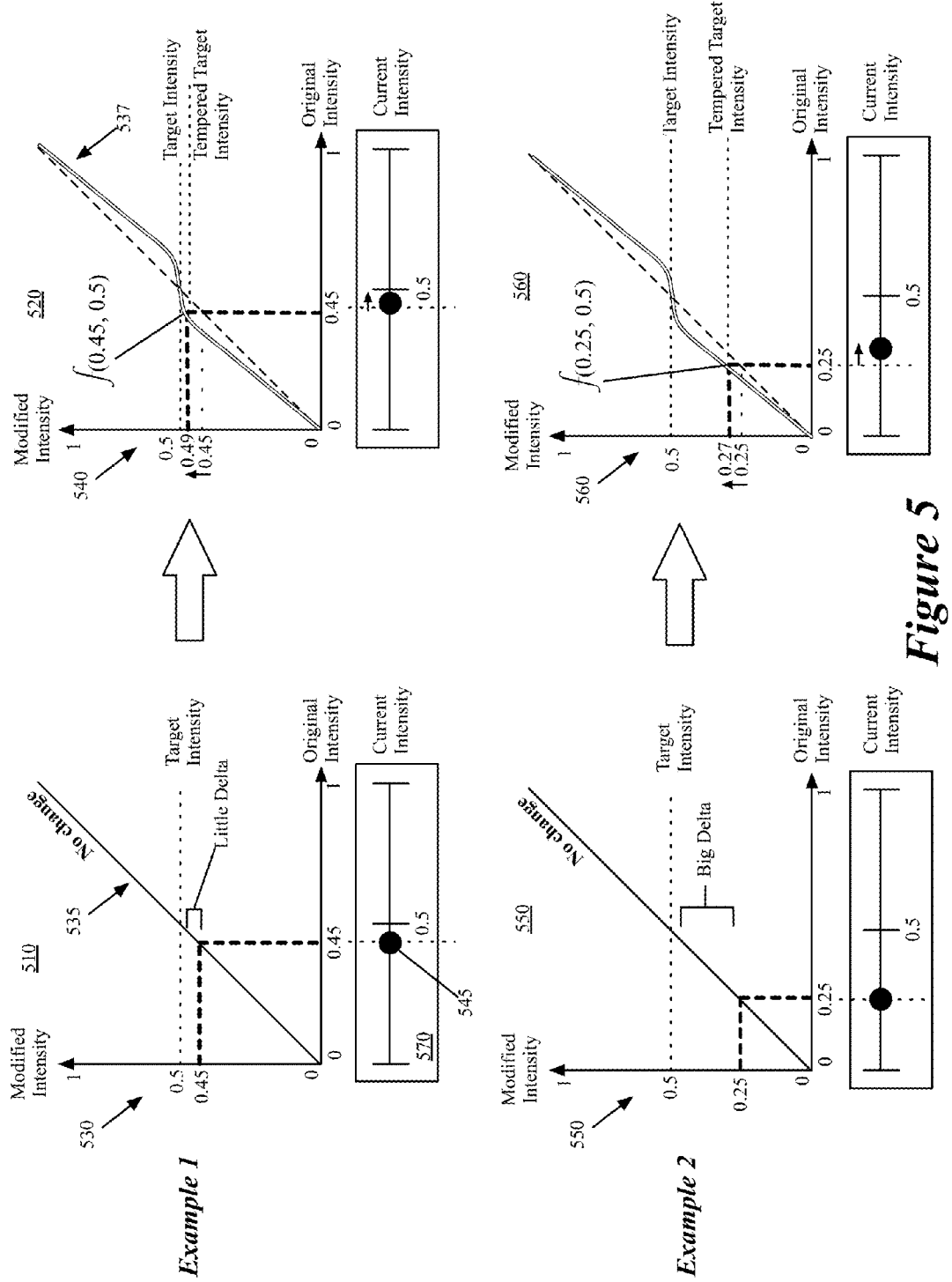
FIG. 5 illustrates two examples of computed tempered intensity values for two input images that each has an average intensity value that is less than the target intensity value.

Having described the individual components of the auto exposure adjustment module 410, the operation of FIG. 4 is described by reference to four examples illustrated in FIGS. 5 and 6. FIG. 5 illustrates two examples of computed tempered intensity values for two input images that each has an average intensity value that is less than the target intensity value. A first input image having an average intensity value of 0.45 is used to compute the tempered intensity value in a first example of FIG. 5. A second image having an average intensity value of 0.25 is used to compute the tempered intensity value in a second example of FIG. 5.

As shown in different stages of FIG. 5, an intensity indicator 570 conceptually illustrates a value of the intensity currently computed for an image. Unlike the slider control 370, which demonstrates relative exposure value adjustments (e.g., EV+1 doubles the intensity of the image, while EV−1 halves the intensity of the image) for each position on the slider track 390, the intensity indicator 570 demonstrates the currently computed value of the image's intensity at the position of the slider 545.

Also, the response graphs 530 and 550 shown in FIG. 5 illustrate a state of no change for an image that will be processed. These response graphs 530 and 550 are shown to conceptually illustrate that the example described for FIG. 5 includes a target intensity (i.e., the horizontal dashed line at y-axis value 0.5 in these examples) and a current intensity (i.e., the darkened dashed line at 0.45 of the x-axis shown in the first example). In other words, the response graphs 530 and 550 do not illustrate a change of any image values, but instead provide context for describing subsequent computations that illustrate the compromise between making a full intensity adjustment to the target intensity and making no intensity adjustment. Furthermore, unlike the values illustrated along the x-axis and y-axis of the response graphs in FIG. 3, the values along the x-axis of the response graphs in FIG. 5 are not mapped to the values along the y-axis. In this example, the values illustrate the result of making tempered adjustments to the intensity of the image. Therefore, the individual pixel values of the image are not shown in the response graphs as being mapped to a corresponding output value. Instead, for example, a value that is shown along the x-axis of the response graph can be an average intensity value of all the pixels, while the corresponding value along the y-axis can be the average intensity value of all the pixels after making a tempered intensity adjustment (i.e., in response graphs 540 and 560).

In a first stage 510 of the first example, the response graph 530 is shown which represents intensity values (e.g., average computed luminance) before and after an intensity adjustment to the original image 455 that the image analyzer 420 retrieves from the image storage 450. In this example, a straight 45° response curve 535 is shown. In particular, the intensity value of 0.45 along the x-axis corresponds to the intensity value of 0.45 along the y-axis. This is shown by the bold dashed lines connecting at the response curve 535. As there is no change in the image intensity shown in this response graph 530, the values along the x-axis and y-axis are the same at this stage 510.

The target intensity value of 0.5 is also shown by the faint horizontal dashed line across the response graph 530. The target intensity, in some embodiments, is a pre-determined value of a desired intensity for any image. With respect to FIG. 4, the image analyzer 420 identifies the initial intensity value for the image based on the average computed intensity of the image. As shown at this stage 510, the slider 545 is positioned slightly to the left of the 0.5 mark on the intensity indicator 570. The image analyzer 420 then provides the average intensity value of the image to the exposure value identifier 430.

In a second stage 520 of the first example, the response graph 540 is shown with a curve 537 for adjusting the intensity value (e.g., average computed luminance) of the image. The curve 537 is based on the first function (i.e., $f_{(I, T)}$) shown in the breakout box 460 of FIG. 4. In some embodiments, when the difference between the input intensity value and the target intensity value is sufficiently small, the curve 537 closely correlates the input intensity value (e.g., average computed luminance) to the target intensity value. In this example, the input intensity value (i.e., 0.45) and the target intensity value (i.e., 0.5) differ by a small amount. As shown, at this stage 520, the curve 537 closely correlates the input value to an output value at the tempered target intensity value of 0.49. In other words, the first function is used to temper the adjustment of the intensity, so that the resulting tempered intensity value (i.e., 0.49) is very close to, but not completely at, the target intensity (i.e., 0.5).

Based on the tempered target intensity value (i.e., 0.49), the exposure value identifier 430 identifies the new exposure value. In some embodiments, the exposure value identifier 430 determines the new exposure value by using a second function (i.e., $G_{(I, T')}$) as shown in the breakout box 460 of FIG. 4) based on the tempered target intensity value (T') and the average intensity value (I) of the image. For example, the exposure value can be determined for a positive change in EV when there is an increase in intensity of the image. The exposure value identifier 430 then provides the identified exposure value 435 to the exposure adjustor 440. Based on the exposure value, the exposure adjustor 440 then identifies the multiplier value to use for adjusting the intensity value of each pixel in order to modify the average intensity of the image to the tempered target intensity (i.e., 0.49) calculated in this example. As shown at this stage 520, the slider 545 is positioned closer to the 0.5 mark on the intensity indicator 570 to reflect the modified average intensity of the image. In this example, because the delta between the input and target intensities is small, the resulting adjustment toward the target intensity is dramatic—amounting to 80% of the difference between the input intensity value and the target intensity value.

In a first stage 550 of the second example, the input intensity value (e.g., average computed luminance) of the original image 455 is 0.25 and corresponds to the output intensity value of 0.25. Thus, the image analyzer 420 identifies the initial average intensity value for the image, as shown by the slider 545 positioned far to the left of the 0.5 mark on the intensity indicator 570. The image analyzer 420 then provides this average intensity value (i.e., 0.25) to the exposure value identifier 430.

In a second stage 560 of the second example, the curve 537, which is based on the first function (i.e., $f_{(I, T)}$), is shown as correlating the input intensity value of 0.25 to an output value of 0.27. Unlike in the first example, where the difference between input and target intensity values is sufficiently small, here in the second example, where the difference between the input and target intensity values is sufficiently large, the curve 537 significantly mitigates the change in the intensity. Specifically, the curve 537 correlates the intensity value along the x-axis to an intensity value along the y-axis that is far from the target intensity value. In this example, the input intensity value (i.e., 0.25) and the target intensity value (i.e., 0.5) differ by a large amount. Accordingly, the input value correlates to a value that is closer to the target than the input value itself, but that is substantially closer to input intensity value than it is to the target intensity value (i.e., increasing intensity from 0.25 to only 0.27).

Based on the tempered target intensity value, the exposure value identifier 430 identifies the new exposure value. In some embodiments, the exposure value identifier 430 determines the new exposure value based on the tempered target intensity value used in the second function (i.e., $G_{(I, T)}$). The exposure value identifier 430 then provides the identified exposure value 435 to the exposure adjustor 440. Based on the exposure value, the exposure adjustor 440 then identifies the multiplier value to use for adjusting the intensity value of each pixel in order to modify the average intensity of the image (i.e., 0.25) to the tempered target intensity (i.e., 0.27). As shown at this stage 560, the slider 545 is re-positioned only marginally closer to the 0.5 mark on the intensity indicator 570 to reflect the heavily tempered average intensity of the image. In contrast to the first example of FIG. 5, the resulting adjustment toward the target intensity, in this example, is merely 8% of the difference between the input intensity value and the target intensity value.

As shown in the first and second examples of FIG. 5, when the average intensity value is less than the target intensity value, the auto exposure adjustment module 410 modifies all of the pixel intensity values to increase the average intensity value toward the target intensity value. In some embodiments, the amount by which the average intensity value of the image is increased, depends on the difference (delta) between the average intensity value and the target intensity value (e.g., relatively large increases when the delta is small and relatively small increases when the delta is large). In contrast to the examples illustrated in FIG. 5, in some cases the average intensity value of an image is greater than the target intensity value. In these cases, the auto exposure adjustment module analyzes the image intensity values to identify a slider position associated with a multiplier that decreases the average intensity value of the image.

Figure 6:
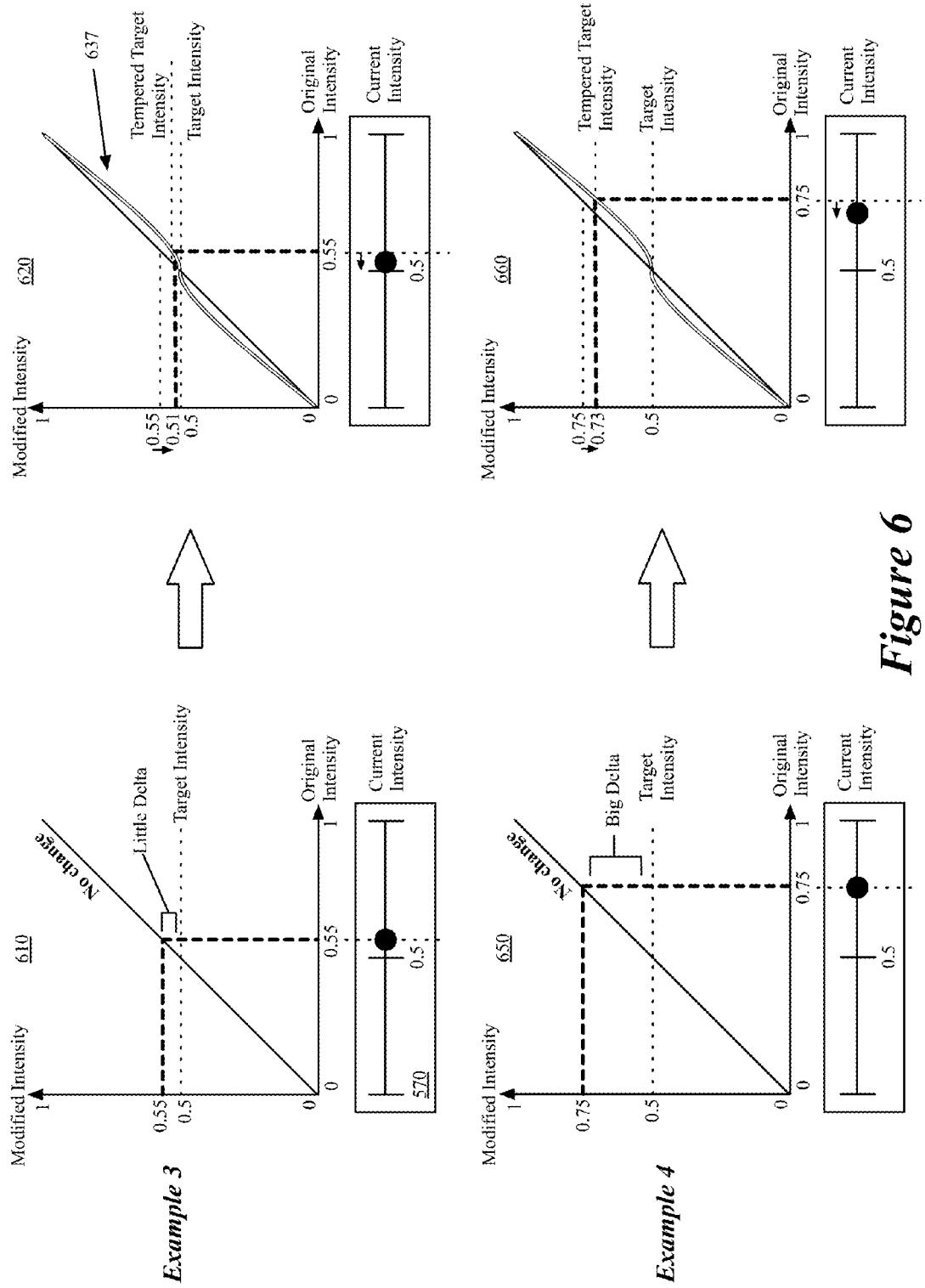
FIG. 6 illustrates two other examples of computed tempered intensity values for two other input images that each has an average intensity value that is greater than the target intensity value.

FIG. 6 illustrates two examples (i.e., third and fourth examples in reference to the description of FIG. 4) of computed tempered intensity values for two input images that each has an average intensity value that is greater than the target intensity value. A first input image having an average intensity value of 0.55 is used to compute the tempered intensity value in the third example. A second image having an average intensity value of 0.75 is used to compute the tempered intensity value in the fourth example.

In a first stage 610 of the third example, the response graph shows that the input intensity value (e.g., average computed luminance) of the original image 455 is 0.55 and is correlated to the output intensity value of 0.55. Thus, the image analyzer 420 identifies the initial intensity value for the image, as shown by the slider 545 positioned slightly to the right of the 0.5 mark on the intensity indicator 570. The image analyzer 420 provides this average intensity value (i.e., 0.55) to the exposure value identifier 430.

In a second stage 620 of the third example, the response curve 637, which is based on the first function (i.e., $f_{(I, T)}$), correlates the input intensity value of 0.55 to an output value of 0.51. Unlike in the first example (i.e., at stage 520 of FIG. 5), in which the input intensity value is increased, the input intensity value shown in this example is decreased. The amount of decrease depends on the function used to temper the intensity adjustment and the difference between the target intensity value and the input intensity value. Specifically, when the delta between the input intensity value and the target intensity value is sufficiently small, the curve 637 closely correlates the input intensity value (e.g., average computed luminance) to the target intensity value. Thus, the input intensity value (i.e., 0.55) is decreased to a tempered target intensity value (i.e., 0.51) that is close to the target intensity value (i.e., 0.5).

Based on the tempered target intensity value, the exposure value identifier 430 identifies the new exposure value. In some embodiments, the exposure value identifier 430 determines the new exposure value based on the tempered target intensity value used in the second function (i.e., $G_{(I, T)}$). The exposure value identifier 430 then provides the identified exposure value 435 to the exposure adjustor 440. Based on the exposure value, the exposure adjustor 440 then identifies the multiplier value to use for adjusting the intensity value of each pixel in order to modify the average intensity of the image (i.e., 0.25) to the tempered target intensity (i.e., 0.27). As shown at this stage 560, the slider 545 is re-positioned only marginally closer to the 0.5 mark on the intensity indicator 570 to reflect the heavily tempered average intensity of the image. In contrast to the first example of FIG. 5, the resulting adjustment toward the target intensity, in this example, is merely 8% of the difference between the input intensity value and the target intensity value.

Based on the tempered target intensity value, the exposure value identifier 430 identifies the new exposure value. In some embodiments, the exposure value identifier 430 determines the new exposure value based on the tempered target intensity value used in the second function (i.e., $G_{(I, T)}$). The exposure value identifier 430 then provides the identified exposure value 435 to the exposure adjustor 440. Based on the exposure value, the exposure adjustor 440 then identifies the multiplier value to use for adjusting the intensity value of each pixel in order to modify the average intensity of the image (i.e., 0.55) to the tempered target intensity (i.e., 0.51). As shown at this stage 620, the slider 545 is re-positioned almost all the way to the desired 0.5 target intensity value on the intensity indicator 570. In terms of the delta calculation, the tempered adjustment is 80% of the difference.

In a first stage 650 of the fourth example, the input intensity value of the original image 455 is 0.75. The difference between the input intensity value and the target intensity value, at this stage 650, is large (i.e., 0.25). In the second stage 660 of the fourth example of FIG. 6, the curve 637 correlates the input intensity value of 0.75 to the tempered target intensity value of 0.73, which is far from the target intensity value of 0.5. Similar to the example shown in FIG. 5, the input intensity and target intensity values differ by a relatively large amount, and therefore, the adjustment is heavily tempered based on the delta. Specifically, the tempered target intensity value after the adjustment is only 8% closer to the target intensity value.

As the third and fourth examples of FIG. 6 show, when the average intensity value of the image is more than the target intensity value, the auto exposure adjustment module 410 modifies all of the image pixel intensity values to decrease the average intensity value toward the target intensity value. In some embodiments, the amount by which the average intensity value of the image is decreased depends on the function used to adjust the intensity and the delta calculation between the average intensity value and the target intensity value.

III. Different Tempering Curves for Different Distances to Black and White

The embodiments described in Section II use one function to temper the target intensity and select an exposure value for modifying the exposure of an image. Other embodiments, however, use several functions to temper the target intensity. Some embodiments select one of several functions that computes a tempered target intensity to select an exposure value for modifying the exposure of the image. For instance, some embodiments analyze the image histogram (e.g., the shape of the histogram or statistics about the histogram), and based on the analysis, select one of several functions to use for tempering the target intensity to modify the exposure of the image. In some embodiments, the selection is made by using a parameter in a general formula. In these embodiments, different parameters plugged into the general formula results in the selection of different functions.

Many of the examples in this application include the selection of a tempering curve based on either a distance to black or a distance to white. In those examples, the curve is used along with an average luminance value of the image to determine the tempered target average luminance. However, in some embodiments a particular tempering curve is not actually calculated. In some embodiments, the distance to black ($D_B$) or the distance to white ($D_W$) and the original average luminance value are plugged into a multi-variable formula that produces the tempered target average luminance in a single step. For example, some embodiments use the following formula to generate the tempered target luminance value (TL), when the original average luminance value (L) is less than the target average luminance value (T):

$$TL = (T(1-D_W)) \times ((1-L\hat{}D_W)) \quad (2)$$

When the original luminance value (L) is more than the target luminance value (T), some embodiments use the following formula to generate the tempered target luminance value (TL):

$$TL = 1 - (((1-T)\hat{}(1-D_B)) \times ((1-L)\hat{}D_B)) \quad (3)$$

In some embodiments, the exposure value (EV) is then determined from either of the equations 2 or 3, by the following equation:

$$EV = \log_2(TL/L) \quad (4)$$

Similarly, some embodiments combine equations 2 and 4 or equations 3 and 4 into one large calculation to determine the EV value directly from the original average luminance value, the distance to black (or the distance to white) value, and the target average luminance value. Some of these embodiments do not perform intermediate calculations to determine a target average luminance value as a separate variable.

Furthermore, instead of using the original luminance value (L) to compute the tempered target average luminance value (TL), some embodiments use the target luminance value (T) and the delta value (i.e., the difference between the target luminance and the original luminance) to compute the tempered target average luminance value. The delta ($\Delta$) is determined in some embodiments based on the following equation:

$$\Delta = T - L \quad (5)$$

In these embodiments, the target luminance (T) and the delta ($\Delta$) are plugged into a similar multi-variable formula to produce the tempered target average luminance in a single step. For example, some embodiments use the following formula to generate the tempered target luminance value (TL), when the delta ($\Delta$) is positive:

$$TL = (T\hat{}(1-D_W)) \times ((1-T+\Delta)\hat{}D_W)) \quad (6)$$

On the other hand, when the delta ($\Delta$) is negative, some embodiments use the following formula to generate the tempered target luminance value (TL):

$$TL = 1 - (((1-T)\hat{}(1-D_B)) \times ((1-T+\Delta)\hat{}D_B)) \quad (7)$$

In some embodiments, the exposure value (EV) is then determined from either of the equations 6 or 7, by the following equation:

$$EV = \log_2(TL/(T-\Delta)) \quad (8)$$

Similarly, some embodiments combine equations 6 and 8 or equations 7 and 8 into one large calculation to determine the EV value directly from the original average luminance value, the distance to black (or the distance to white) value, the target average luminance value, and the delta value. Some of these embodiments do not perform intermediate calculations to determine a target average luminance value as a separate variable.

A. General—Different Curves of Different Functions

Figure 7:
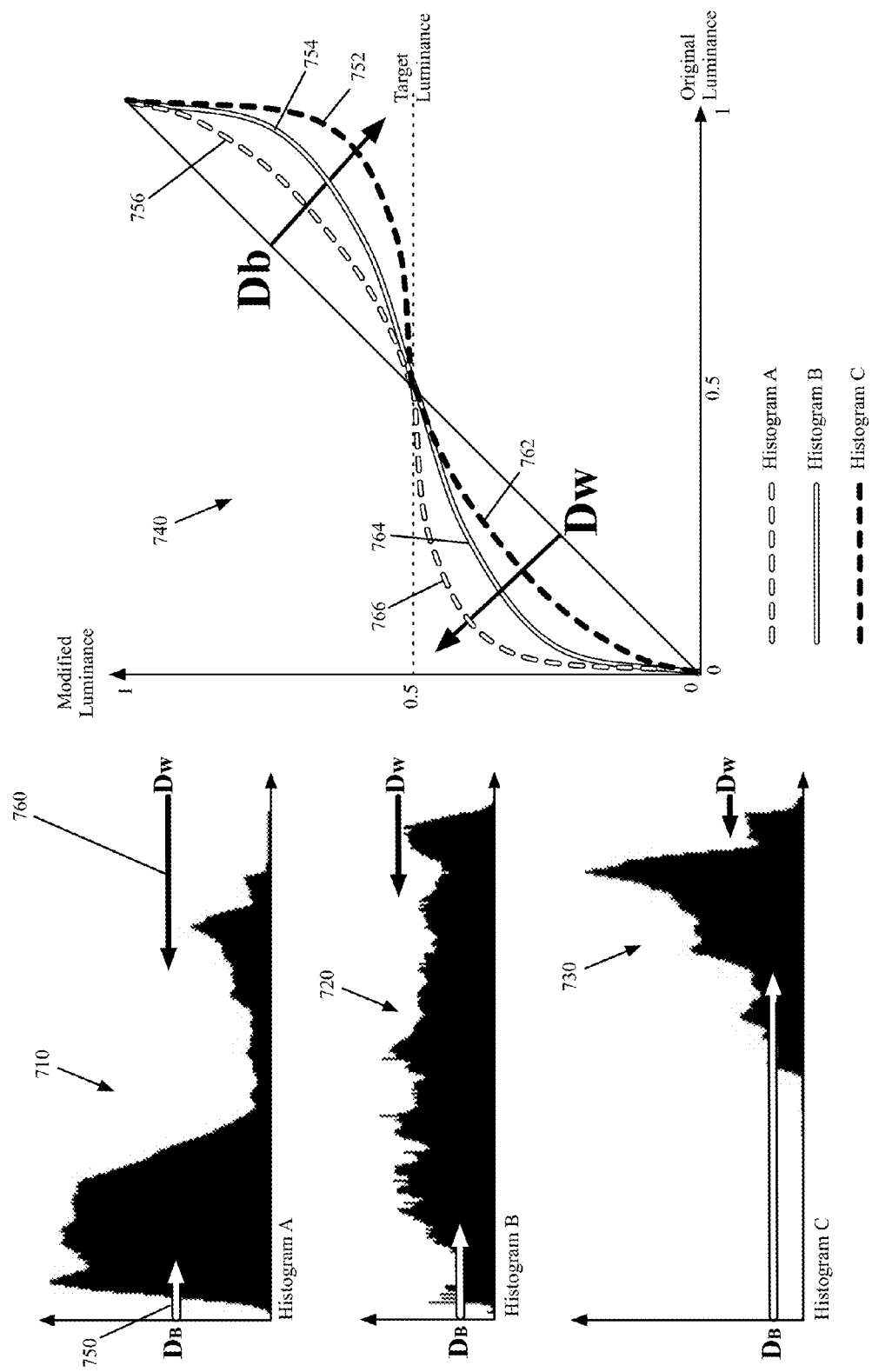
FIG. 7 conceptually illustrates three different tempering functions of some embodiments that are each selectable to temper a target average luminance based on an analysis of the image's histogram.

FIG. 7 conceptually illustrates three different tempering functions of some embodiments that are each selectable to temper the target average luminance based on an analysis of the image's histogram. Specifically, one of the different tempering functions is selected by the auto-exposure adjustment module 410 based on the distance to black or the distance to white in the image histogram in some embodiments. As shown in this figure, the distance to black 750 and the distance to white 760 are indicated by arrows in each of the histograms A, B, and C (710-730). Also shown in this figure is a response graph 740 and several curves 752, 754,

756, 762, 764, and 766, that are based on different functions for tempering the target luminance.

The distance to black 750, in some embodiments, is a measurement from the black edge of the histogram (e.g., the darkest possible tonal value of the image) to a particular percentile of the histogram values. In other words, a percentage of the total number of image pixels is specified which encompasses the darkest pixels within the specified percentile (e.g., the 1% of image pixels between the black edge and the first percentile). For example, the first percentile (e.g., the darkest 1% of pixels) in an image having 6.3 million pixels would encompass the 63,000 darkest pixels of the image. The distance to black 750, then, is the measurement of the distribution in the histogram of those 1% of the darkest pixels of the image in some embodiments. For example, in a histogram that plots pixels at 4096 different values (e.g., an image in RAW format), a sparse distribution of the 63,000 darkest pixels of the histogram may span a portion of the histogram that covers the lowest 10% of histogram values (e.g., 0-409). The distance to black 750 would, therefore, be a relatively large 10% of the histogram. On the other hand, a dense distribution of the 63,000 darkest pixels may span the lowest 0.1% of histogram values (e.g., 0-3). Here, the distance to black 750 would be a relatively small 0.1% of the histogram. While this example describes the specified percentage as 1% of the total number of pixels for the image, other percentages (e.g., 10%, 0.1%, etc.) can be used in other embodiments.

The distance to white 760, in some embodiments, is a measurement from the white edge of the histogram (e.g., the brightest possible pixel of the image) to a particular percentile of the histogram values. A percentage of the total number of image pixels is specified which, in this case, encompasses the brightest pixels within the specified percentile (e.g., the 3% of image pixels plotted in the histogram between the white edge and the ninety-seventh percentile). For example, the ninety-seventh percentile (e.g., the brightest 3% of pixels) in an image having 6.3 million pixels would encompass the 189,000 brightest pixels of the image. The distance to white 760, then, is the measurement of the distribution in the histogram of those 3% of the brightest pixels of the image in some embodiments. For example, in a histogram of an 8-bit JPEG image with 256 different values (e.g., luminance values from 0-255), a sparse distribution of the 189,000 brightest pixels of the histogram may span a portion of the histogram that covers the highest 20% of histogram values (e.g., 204-255). The distance to white 760 would, therefore, be a relatively large 20% of the histogram. On the other hand, a dense distribution of the 189,000 brightest pixels may span the highest 1.5% of histogram values (e.g., 252-255). Here, the distance to white 760 would be a relatively small 1.5% of the histogram. While this example describes the specified percentage as 3% of the total number of pixels for the image, other percentages (e.g., 10%, 0.1%, etc.) can be used in different embodiments.

In some embodiments, different curves are generated from the different functions for tempering the adjustment of the target average luminance. The different functions, in some embodiments, are used to attenuate the amount of average luminance adjusted for different images having different distances to black and/or white. For example, for first and second images that have the same original average luminance value, but different distances to black or white, a first function that is based on the distance to black of a first histogram may specify a tempered target luminance value for a first image, while a different second function that is based on the distance to black of a different second histogram may specify a different tempered target luminance value from which a multiplier value is determined for adjusting the pixels of a second image.

In some embodiments, a particular function is selected from the different functions based on the distance to black or the distance to white in the histogram for the image. In these embodiments, the curve specified by the function identifies the tempered target luminance value from which a multiplier value is determined for adjusting all of the pixels of the image. In some embodiments, the desired adjustment (e.g., increasing or decreasing luminance) is affected by only one of the distance to black and the distance to white.

In some embodiments, when the average luminance for the pixels of the image is low, the application automatically increases the luminance of the image. However, in some images, even though the average luminance is low, a significant minority of the pixels in the image may have high luminance. A large increase in the luminance value would cause many of the pixels to be blown out (e.g., increased beyond the maximum luminance value). Some embodiments increase the luminance less when there is a significant minority of bright pixels than when there are relatively few bright pixels.

Similarly, when the average luminance of the pixels is high, the application automatically decreases the luminance value. However, in some images, even though the average luminance is high, a significant minority of the pixels in the image have low luminance. A large decrease in the exposure value would cause a loss of visible detail among many of the darker pixels. Some embodiments decrease the luminance less when there is a significant minority of dark pixels than when there are relatively few dark pixels.

Accordingly, in some of these embodiments, an adjustment to increase the average luminance of the image is affected by the distance to white, while an adjustment to decrease the average luminance is affected by the distance to black. Thus, in some embodiments, an analysis of the distance to black or distance to white for the histogram is needed to determine the function to select. For example, a first image with a lot of pixels against the black edge of the histogram (i.e., a short distance to black) should not get much darker, while a second image with very few (or no) pixels against the black edge of the histogram (i.e., a long distance to black) may be darkened considerably. In this example, the function selected to adjust the average luminance of the first image could be a function that tempers the luminance adjustment more than the function selected to adjust the average luminance of the second image.

As each histogram has a different distribution of luminance values, the results of decreasing brightness in the images represented by each of the histograms would be substantially different from each other. As shown in FIG. 7, a first histogram 710 (Histogram A) charts the frequency of pixels at different luminance values along the dynamic range of the image. As shown, a majority of the pixels have luminance values that lie in a darker region of the histogram 710. As the majority of pixels lie in the darker region of the histogram, the image represented by the first histogram 710 has an overall exposure that is more dark than it is bright. Some embodiments are equipped to adjust the exposure of images having such unbalanced exposure levels by identifying the distance to black and/or the distance to white. The distance to black, for instance, is determined according to the particular percentile specified for the darkest pixels (e.g., pixels having the lowest luminance values) of the image in some embodiments. In this case, a heavy distribution of pixels having luminance values in the darker region is reflected by the short white arrow indicating the distance to black ($D_B$) 750. At the other end of the histogram 710, pixels are sparsely populated in a brighter region of the histogram. This relatively light distribution of pixels in the brighter region is reflected by the long black arrow indicating the distance to white ($D_W$) 760. As above, the distance to white ($D_W$) 760 is determined, in some embodiments, according to the particular percentile specified for the brightest pixels (e.g., pixels having the highest luminance values) of the image.

In some embodiments, the distance to black in the histogram is determined before reducing exposure brightness of the image by decreasing the average luminance. In these embodiments, a tempering function is selected which optimizes the adjustment of the average luminance for the image.

As shown for histogram A 710, in this example, the selected function has the shortest distance to black among the three histograms 710, 720, and 730. In this case, the distance to black is short because a majority of pixels are distributed in the darker region of the image. Therefore, there is little room to reduce the average luminance of the image without affecting the darker pixels (e.g., reducing the brightness or luminance values of pixels may result in a number of dark pixels being crushed to the darkest black luminance value possible for the image). Thus, the selected function generates the tempering curve 756. The other tempering curves, 754 and 752, correlate different average luminance values for different images to different tempered target luminance values. In particular, the tempering curve 756 attenuates the luminance adjustment more than the other tempering curves, 754 and 752. As shown, the luminance adjustments provided by the tempering curve 756 are farther from the target luminance (horizontal dashed line) than either of the other tempering curves 754 and 752.

On the other hand, the distance to black for histogram B 720, in this example, is longer than the distance to black in histogram A 710, and shorter than the distance to black in histogram 730. Therefore, the selected function, in this example, generates the tempering curve 754. The distance to black for histogram C 730 is longer than the distances to black for both histograms A and B 710 and 720. In this case, the selected function generates the tempering curve 752.

Similar to the determination of the distance to black for adjustments that decrease the brightness of the image, in some embodiments the distance to white is determined when increasing brightness for the image. In some embodiments, the distance to white of the histogram is determined before increasing the average luminance of the image. In these embodiments, a tempering function is selected which optimizes the luminance adjustment for the image.

For instance, three different distances to white are shown in histograms A, B, and C, which illustrate the selections of different tempering curves. In particular, the distance to white in histogram A 710 is long, the distance to white in histogram C 730 is short, and the distance to white in histogram B 720 is in the middle. In this example, the selected function for increasing the average luminance in histogram A 710, would generate the tempering curve 766, the function for histogram B 720 would generate the tempering curve 764, and the function for histogram C 730 would generate the tempering curve 762.

The examples described above generally discuss selecting a function from several functions to temper the adjustments to luminance for modifying the exposure of the image. The next section describes a process for adjusting the average luminance of an image using multiple curves from multiple functions.

B. Tempered Exposure Adjustment Process

Figure 8:
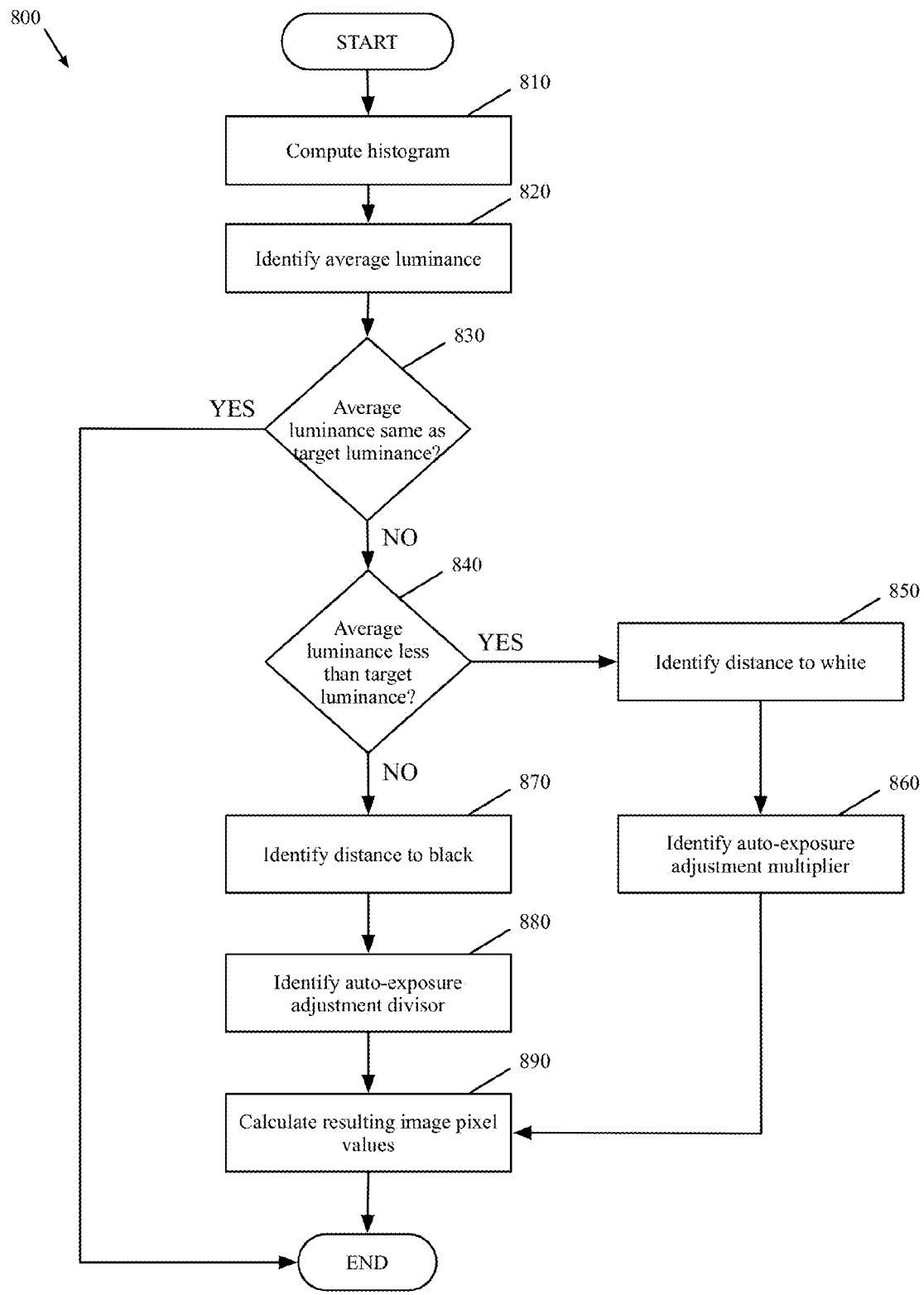
FIG. 8 conceptually illustrates a process of some embodiments that adjusts the exposure of an image when an average luminance of the image is not the same as a target luminance for the image.

FIG. 8 conceptually illustrates a process 800 of some embodiments that adjusts the exposure of an image when the average luminance of the image is not the same as a target luminance for the image. The auto-exposure adjustment module 410 of the media editing application performs the process 800, in some embodiments, when a user invokes the auto-exposure adjustment module 410. Moreover, the process 800 of some embodiments is performed by the auto-exposure adjustment module 410 when an auto-enhance module of the media editing application invokes the auto-exposure adjustment module 410 during an auto-enhance pipeline process.

The process 800 begins by computing (at 810) a histogram of an image. The image may be retrieved from a storage (e.g., the original image 455 retrieved from the image storage 450) or from a device that captured the image (e.g., during an image import process of the media editing application).

Next, the process 800 identifies (at 820) the average luminance of the image. In different embodiments, the average luminance expresses different luminance values for the image. For instance, the average luminance can be the arithmetic mean luminance, the median luminance, or any other measure of central tendency for the luminance of the image.

After identifying the average luminance of the image, the process 800 determines (at 830) whether the original average luminance is the same as a desired target luminance for the image. If the average luminance is the same as the target luminance, the process 800 ends.

Otherwise, if the average luminance is not the same as the target luminance, the process 800 proceeds to 840 to determine whether the original average luminance is less than the target luminance. If the process determines (at 840) that the original average luminance is less than the target luminance, the process 800 identifies (at 850) the distance to white. After identifying the distance to white, the process 800 identifies (at 860) an auto-exposure adjustment multiplier, which when applied to the original pixel values of the image, adjusts the exposure of the image (i.e., modifies the average luminance of the image). The adjustment multiplier is a value by which the luminance value of every pixel in the image is multiplied to adjust the exposure of the image. In some embodiments, the adjustment multiplier is based on the tempered target luminance value computed from the selected tempering function. After identifying the auto-exposure adjustment multiplier, the process 800 transitions to 890 to calculate the resulting luminance values of the pixels. The resulting average luminance of the image is set to equal the tempered target luminance value when the luminance value of every pixel in the image is multiplied by the adjustment multiplier.

Referring back to the determination made at 840, if the average luminance is more than the target luminance, the process 800 proceeds to 870 to identify a distance to black for the computed histogram. After identifying the distance to black, the process 800 identifies (at 880) an auto-exposure adjustment multiplier (or divisor), which when applied to the original pixel values of the image, adjusts the average luminance of the image to modify the exposure. In some embodiments, the identified adjustment multiplier (or divisor) is based on the tempered target luminance value computed from the selected tempering function. In some embodiments, the adjustment multiplier (or divisor) is a value by which the luminance value of every pixel in the image is multiplier (or divided) to adjust the average luminance of the image, and thereby modify the exposure of the image. After identifying the auto-exposure adjustment multiplier (or divisor), the process 800 transitions to 890 to calculate the resulting luminance values of the pixels of the image. In some embodiments, when the luminance value of every pixel in the image is multiplied (or divided) by the adjustment multiplier (or divisor), the average luminance of the image (i.e., the luminance values of all the pixels averaged) is equal to the tempered target luminance value.

Although the processes described above are described in a particular order, different embodiments may perform these processes in a different order.

C. Different Curves for Different Distances to Black

Having discussed the selection of a tempering curve from multiple tempering curves based on the distance to black or the distance to white, the next several examples describe using different curves to adjust the average computed luminance in different histograms having different distances to black. Two examples are described by reference to FIG. 9, which depicts different curves for decreasing the average computed luminance in two different image histograms having different distances to black.

i. Short Distance to Black

FIG. 9 illustrates two examples of decreasing the average computed luminance by using different tempering curves based on different distances to black for two different histograms having the same original average computed luminance. FIG. 9 is described by reference to FIGS. 10 and 11, which conceptually illustrate a graphical user interface (GUI) of a media editing application 1030 of some embodiments that adjusts the average computed luminance of an image. As shown, the media editing application 1030 has a set of user-selectable image editing controls 1050 that includes a user-selectable auto exposure tool 1055 of some embodiments, a preview display area 1040 that displays images, and a histogram display area 1060 that displays histograms of images displayed in the preview display area 1040.

In the first example of FIG. 9, which is described by reference to FIG. 10, the tempering curve is based on a short distance to black. As shown in the first stage 1010 of FIG. 10, an original image is displayed in the preview display area 1040 and a histogram 945 is displayed in the histogram display area 1060 of the media editing application 1030. The appearance of the original image at this stage 1010 is generally bright (e.g., sky, water, and person displayed in light tones) with only one substantially dark item displayed in the original image (e.g., the kayak). In some embodiments, the histogram 945 is computed when the original image is loaded into the preview display area 1040. For instance, in the first stage 910 of the first example in FIG. 9, the histogram 945 has been computed for the original image and represents the distribution of luminance values for the pixels of the original image.

After the image histogram 945 is computed, in some embodiments, the intensity indicator 570 is set to the average computed luminance of the image. In some embodiments, the average computed luminance is computed from the distribution of histogram values. In other embodiments, the average computed luminance is identified by retrieving (e.g., from a storage) a pre-computed average luminance value for the original image (e.g., pre-computed by the device that captured the original image or pre-computed during an image import process of the media editing application). As shown in the first stage 910 of the first example in FIG. 9, the intensity indicator 570 indicates that the average computed luminance is 0.8 for the original image.

In some embodiments, the media editing application 1030 automatically updates one or more of the image editing controls 1050 of the GUI based on the values (e.g., the average computed luminance) derived from the original image histogram 945. For instance, in the first stage 1010 of FIG. 10, the brightness slider 1053 automatically shows that the average computed luminance of the first image is 0.8.

As shown in the first stage 1010, a user has selected the auto exposure tool 1055. In some embodiments, a selection of the auto exposure tool 1055 causes the media editing application to evaluate the exposure characteristics of the original image to determine the type and amount of an exposure adjustment to perform. In some embodiments, this evaluation is based on a pre-defined target luminance (e.g., 0.5) that is desired for the image. In some embodiments, when the average computed luminance is greater than the target luminance, the media editing application performs a luminance reduction operation (e.g., darkens the image). In contrast, when the average computed luminance is less than the target luminance, the media editing application increases the luminance of the image (e.g., brightens the image).

As shown in FIG. 9, the pre-defined target luminance is 0.5, which is less than the average computed luminance of 0.8 identified in the first stage 910 of FIG. 9. Accordingly, the media editing application, of some embodiments, performs an operation that reduces the average luminance of the image toward the target luminance desired for the image. In some embodiments, the operation for reducing the average luminance is based on the distance to black in the histogram 945. In these embodiments, therefore, the media editing application identifies the distance to black (e.g., determining the set black percentile and then identifying the location along the x-axis of the histogram at which the percentile resides). In this example, the identified distance to black is short because, as shown at this stage 910, there is a significant spike of pixels at the darkest luminance values of the histogram.

After identifying the distance to black, an exposure tempering curve is selected for tempering the average luminance adjustment. As described above, the media editing application 1030 of some embodiments selects the tempering curve from several different exposure tempering curves based on the identified distance to black. Then the selected tempering curve is applied to determine the tempered luminance value. Shown in the response graph 950 at the second stage 920, the selected tempering curve correlates the average computed luminance value of 0.8 before modification to a modified average luminance value of 0.64.

For this figure, the tempered target luminance (T) is less than the original average computed luminance (L). In order to lower the average luminance of the image, the application of some embodiments multiplies the luminance value of each pixel by a multiplier (M), which is determined by the equation:

$$M = T/L \tag{9}$$

In some embodiments, the exposure adjustment value (EV) is calculated based on the multiplier, using the equation:

$$EV = \log_2(M) \tag{10}$$

The equations 9 and 10 lead to negative EVs when the tempered target luminance (T) is less than the original average computed luminance (L).

As shown in the second stage 920, the pixel distribution in the histogram 955 includes a taller and narrower spike of the darker pixels and narrower and taller group of the brighter pixels, which are also shifted significantly to the left (i.e., darker). Furthermore, the intensity indicator 570 reflects the modified luminance value (0.64) based on the modified distribution of pixels toward the left (darker) side of the image histogram 955.

Figure 10:
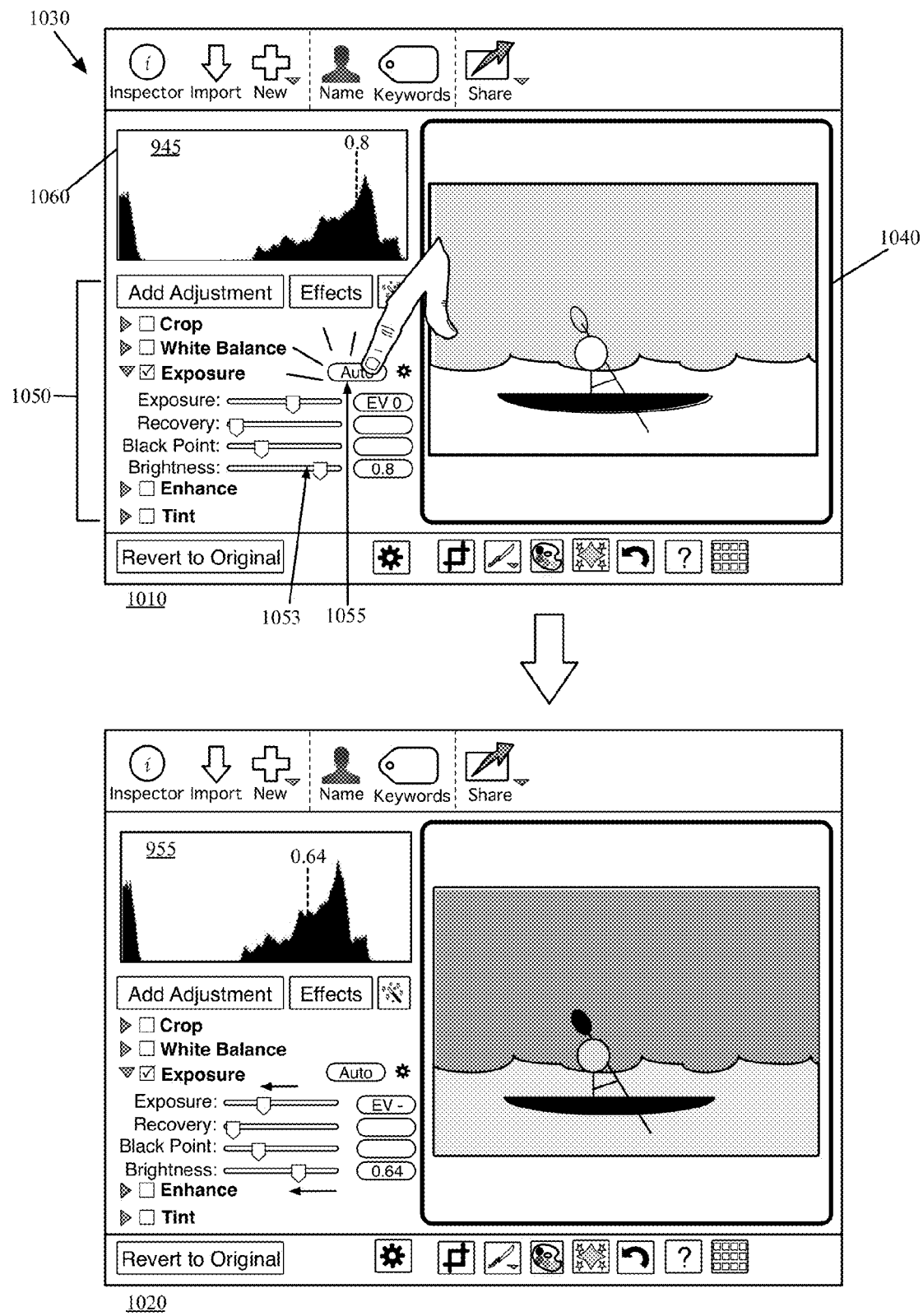
FIG. 10 illustrates an example of a GUI for adjusting image luminance when the tempering curve is based on a short distance to black.

The modification to the average computed luminance of the original image is shown in FIG. 10, where the modified image, displayed in the preview display area 1040, appears darker than the image displayed in the first stage 1010. The histogram 955, representing this darker modified image, is also shown in the second stage 1020 of FIG. 10. As an updated set of values are associated with this histogram 955, one or more of the image editing tools 1050 (e.g., brightness, exposure) have been updated at this stage 1020.

While this example discussed luminance modifications when the distance to black is short, the next example discusses luminance modifications when the distance to black is long.

ii. Long Distance to Black

The second example of FIG. 9 is described by reference to FIG. 11 where the tempering curve is based on a long distance to black. As shown in the first stage 1110 of FIG. 11, the histogram 965 is displayed representing an original image (different from the original image of FIG. 10) that is displayed in the preview display area 1040. The appearance of the original image at this stage 1110 is generally bright without any substantially dark elements in the image.

As shown in the third stage 930 of FIG. 9, the intensity indicator 570 indicates that the average computed luminance is 0.8 for the original image. Although the histogram 965 in this example is different from the histogram 945 in the first example of FIG. 9, the average computed luminance for both histograms is the same.

As shown in the first stage 1110 of FIG. 11, the user has selected the auto exposure tool 1055. The pre-defined target luminance is 0.5, as shown in FIG. 9, is less than the average computed luminance of 0.8 shown on the brightness slider 1053 in FIG. 11. Therefore, the average computed luminance (0.8) is greater than the target luminance (0.5), so the overall luminance will be reduced. In this example, the distance to black 750 is large, so a tempering curve is selected from among several tempering curves. The selected tempering curve at this stage 940 is different from the tempering curve selected at stage 920. Shown in the response graph 970, the selected tempering curve maps the average computed luminance value of 0.8 before modification to a modified average luminance value of 0.53. At this stage 940, the tempered luminance value is much closer to the target luminance value than the tempered luminance value of the second stage 920.

Once the tempered target luminance value is identified, the original average computed luminance is reduced using the equations 9 and 10 described above. However, in this example, the tempered target luminance (T) is closer to the actual target luminance value (e.g., 0.5) than it is to the original average computed luminance (L).

After the tempering function is applied and the pixel values are reduced, the histogram 975 shown at the fourth stage 940 exhibits the modified distribution of pixels (e.g., more spread out than the nearly one-sided distribution of pixels at the third stage 930). The intensity indicator 570 also reflects the modified average luminance value at the tempered target value (0.53). The modification to the average computed luminance of the original image is shown in FIG. 11, where the modified image appears darker than the original image.

D. Different Curves for Different Distances to White

Having described some examples of using different tempering curves based on different histograms having different distances to black, the next section describes using different tempering curves based on different histograms having different distances to white. The next two examples are described by reference to FIG. 12, which depicts different curves for increasing luminance in two different image histograms having different distances to white.

i. Short Distance to White

Figure 12:
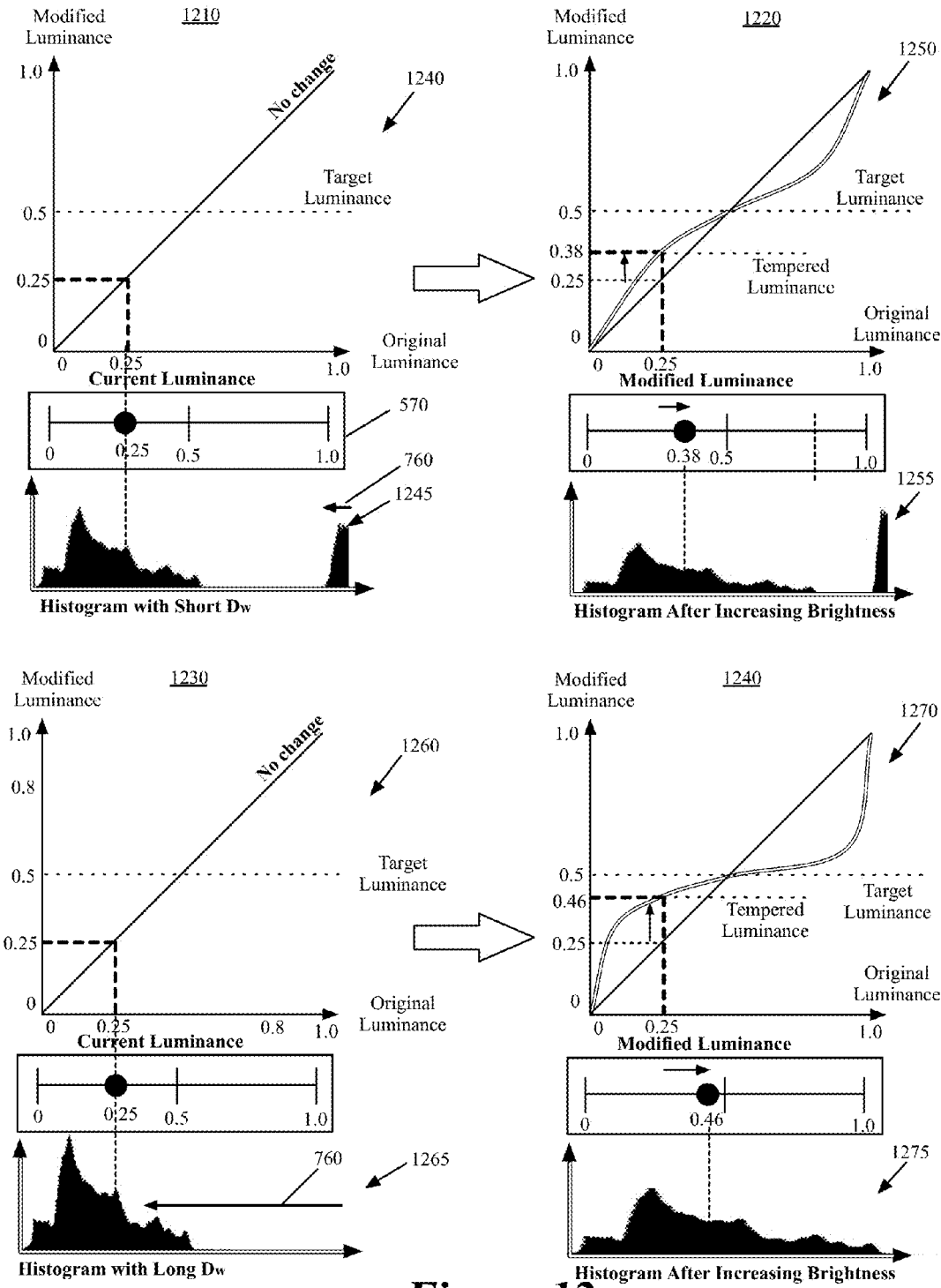
FIG. 12 illustrates different image histograms having the same average computed luminance but different tempering curves for increasing image luminance based on different distances to white of some embodiments.

The first example of FIG. 12 is described by reference to FIG. 13, in which the tempering curve used to adjust the exposure of an image is based on a short distance to white. As shown in the first stage 1210 of FIG. 12, the histogram 1245 represents a distribution of image pixel values (i.e., luminance values) for an original image. In this example, the histogram represents the image shown in the preview display area 1040 in FIG. 13. The appearance of the original image in the preview display area 1040 is generally dark (e.g., the house, the door, and the roof are displayed in dark tones) with only a few bright image features (e.g., the windows on the house, the sky). At this stage 1210, a pre-defined target luminance (0.5) is shown in the response graph 1240 and the intensity indicator 570 indicates that the average computed luminance for the original image is 0.25.

In the first stage 1310 of FIG. 13, the user selects the auto exposure tool 1055. In this example, the auto exposure adjustment operation increases luminance because the target luminance (0.5) is more than the average computed luminance (0.25) shown on the brightness slider 1053 in FIG. 13. The amount of increase, in this example, is based on a short distance to white 760, as shown in the histogram 1245. Accordingly, a tempering curve for this short distance to white is selected from among several tempering curves.

In the second stage 1220, the selected tempering curve is displayed in the response graph 1250. Based on the selected tempering curve, the average computed luminance value of 0.25 is correlated to a tempered luminance value of 0.38. Once the tempered luminance value is identified, the image is brightened using a multiplier, such as the one determined using equation 9. Then, equation 10 is used to determine the exposure value (i.e., $EV=\log_2(M)$) to increase the image luminance. At the second stage 1220, the histogram 1255 represents the modified distribution of pixels after the tempering function is applied. The intensity indicator 570 also represents the modified luminance value (0.38) at this stage 1220.

In the second stage 1320 of FIG. 13, the modified average luminance is shown in the GUI 1030 by the new position of the brightness slider 1053 and the value (0.38) corresponding to the position of the brightness slider 1053. As shown in this figure, the image displayed in the preview display area is visibly brighter than the image displayed in the preview display area 1040 during the first stage 1310. Furthermore, notable features of the image (e.g., the windows panes) remain visible after the auto exposure adjustment in the second stage 1320.

ii. Long Distance to White

The second example of FIG. 12 is described by reference to FIG. 14 where the tempering curve is based on a long distance to white. As shown in the third stage 1230 of FIG. 12, the histogram 1265 represents an original image that is shown in the preview display area 1040 in FIG. 14. The appearance of the original image at this stage 1210 is generally dark. The intensity indicator 570 indicates that the average computed luminance is 0.25 for the original image. Although the histogram 1265 in this example is different from the histogram 1245 in the first example of FIG. 12, the average computed luminance for both histograms is the same.

In the first stage 1410 of FIG. 14, the user selects the auto exposure tool 1055. The pre-defined target luminance is 0.5, as shown in FIG. 12, is more than the average computed luminance of 0.25 in this example, and therefore, the luminance will be increased. In this example, a different tempering curve is selected from among several tempering curves based on a large distance to white 760, as opposed to the short distance to white 750 shown in the second stage 1220. Also, the response graph 1270 displays the selected tempering curve, which maps the average computed luminance value of 0.25 to a tempered luminance value of 0.46. At this stage 1240, the tempered luminance value is much closer to the target luminance value than the tempered luminance value of the second stage 1220.

Once the tempered luminance value is identified, the original average computed luminance is increased by the multiplier. The intensity indicator 570 now indicates the modified luminance value (0.46), and the brighter image displayed at the second stage 1420 of FIG. 14 reflects the increased average luminance value.

E. Exposure Adjustment Comparisons

Having described some examples of using different tempering curves based on different histograms having different distances to black and different distances to white, the next section compares full exposure adjustments with tempered exposure adjustments. In particular, full exposure adjustments include adjusting the original average computed luminance of the image all the way to the target luminance, while tempered exposure adjustments include tempering the adjustment to only adjust the original average computed luminance of the image to the tempered target luminance value.

i. Short Distance to White Comparison

Figure 15:
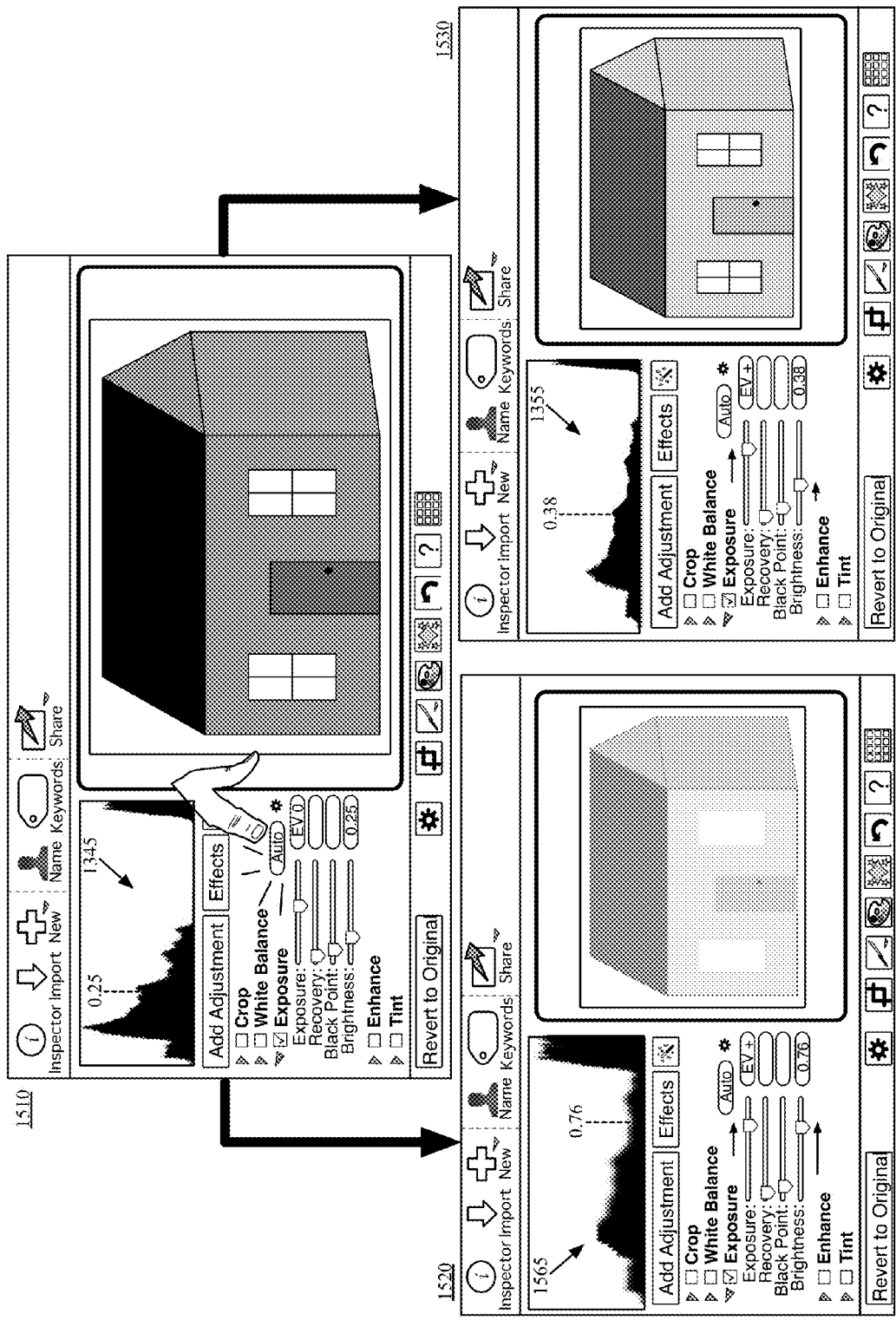
FIG. 15 provides two examples that illustrate the difference between a full exposure adjustment of an original image and a tempered exposure adjustment of the image.

FIG. 15 conceptually illustrates two examples that illustrate the difference between a full exposure adjustment of an original image and a tempered exposure adjustment of the image. In these examples, the average computed luminance of the original image is increased (e.g., brightened) when the distance to white is short. The GUI illustrated in FIG. 15 is similar to the GUI 1030 shown in FIG. 13, however, in FIG. 15, the average computed luminance of the original image is fully adjusted to the target luminance value in the first example, while the average computed luminance of the original image is adjusted to the tempered luminance value in the second example.

The first stage 1510 shows the GUI with the original image displayed in the preview display area 1040 and histogram 1345 displayed in the histogram display area 1060. The set of exposure adjustment tools 1050 are shown at this stage with exposure settings based on an analysis of the histogram 1345. As shown at this stage, a user selects the auto exposure tool 1055. In some embodiments, the auto exposure adjustment tool 1055 modifies the original average computed luminance of the image all the way to the pre-determined target luminance value. In these embodiments, the auto exposure adjustment tool 1055 does not temper the exposure adjustment.

The second stage 1520 shows the image after the auto exposure adjustment. As shown in the GUI, the image appears substantially brighter than in the first stage 1510. The brightness of the image at this stage 1520 is reflected in the histogram 1565. As shown, the distribution of pixels in the histogram 1565 includes a heavy concentration of pixels with values at the upper (i.e., brighter) values. Accordingly, several features of the image appear blown out or indistinguishable at this stage 1520. For instance, the windows on the front of the house do not show window panes, and the borders of the windows are hard to distinguish from the front wall of the house. Thus, the full exposure adjustment to the target exposure value has brightened the image to a degree that certain details of the image have been lost or blown out.

In contrast, the third stage 1530 shows the image and histogram 1355 after the tempered auto exposure adjustment. In this example, the tempered luminance adjustment of the original image's average computed luminance results in a slightly brighter image. Furthermore, details and features of the image have been retained (e.g., window panes are visible, windows are distinct from the front wall of the house, etc.).

ii. Short Distance to Black Comparison

Figure 16:
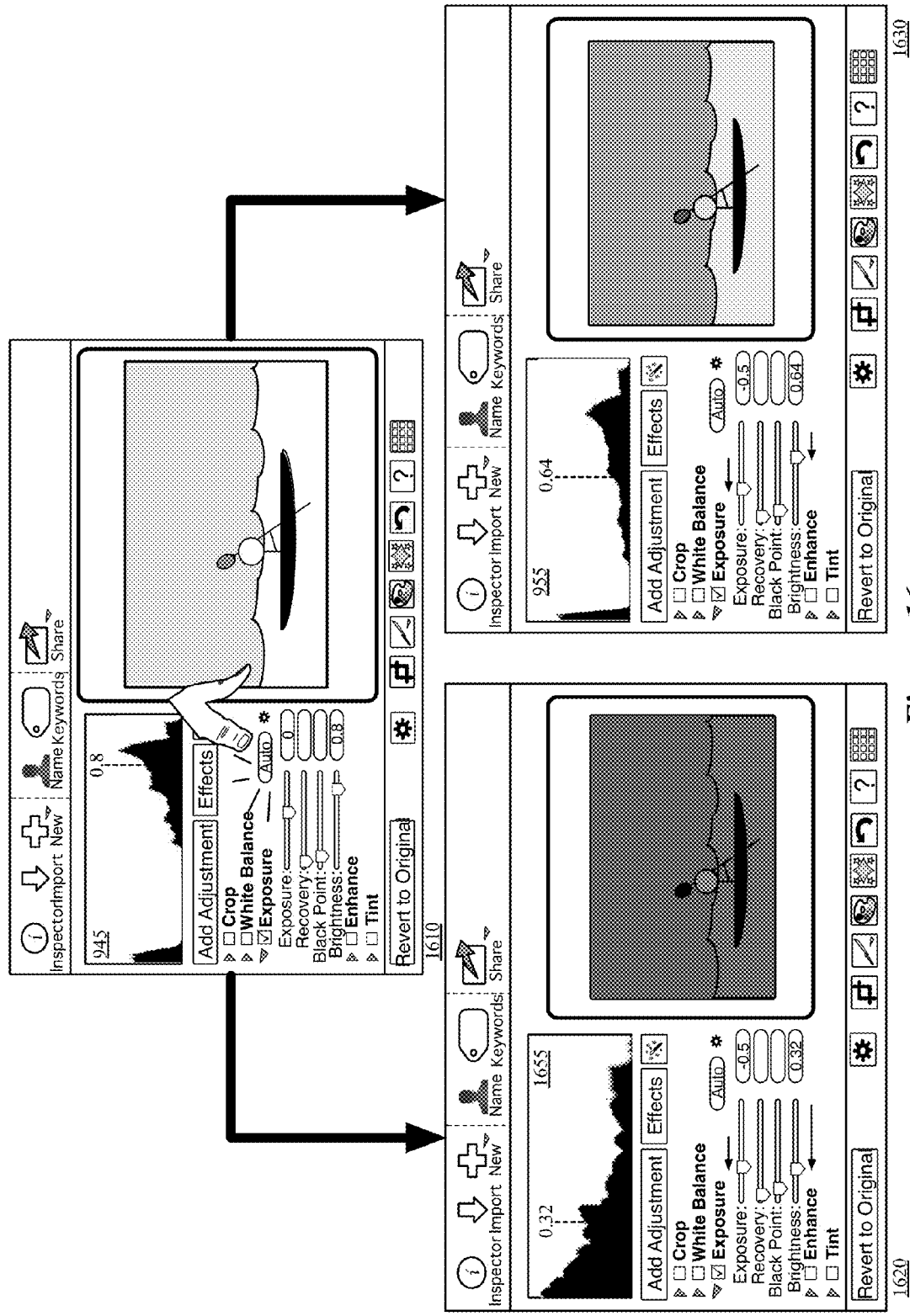
FIG. 16 provides two more examples that illustrate the difference between a full exposure adjustment of the original image and a tempered exposure adjustment of the image.

FIG. 16 conceptually illustrates two examples that illustrate the difference between a full exposure adjustment of an original image and a tempered exposure adjustment of the image. In these examples, the original image is darkened when the distance to black is short. The GUI illustrated in FIG. 16 is similar to the GUI 1030 shown in FIG. 10, however, in FIG. 16, the average computed luminance of the original image is fully adjusted to the target luminance value in the first example, while the average computed luminance of the original image is adjusted to a tempered luminance value in the second example.

The first stage 1610 shows the GUI with the original image and histogram. A user selects the auto exposure tool 1055 at this stage 1610 to perform an automatic exposure adjustment.

The second stage 1620 shows a substantially darker appearance of the image after the average computed luminance of the image was adjusted by the auto exposure adjustment. As shown in the histogram 1655 at this stage 1620, a very large portion of the pixels are located at lower (i.e., darker) values. Several features of the image appear dark with little variation in the level of darkness. Thus, the full adjustment of the average computed luminance of the original image to the target luminance value has darkened the image to a degree that certain details of the image have been crushed or have become indistinguishable from other details.

In contrast, the third stage 1630 shows the image after the tempered auto exposure adjustment modifies the average computed luminance of the original image. In this case, the auto exposure adjustment results in only a slightly darker image, while key image features and details remain distinct from other features and elements of the image.

As these examples show, the automatic exposure adjustments to the average computed luminance of the original image the fully modify the average luminance to the desired target luminance value, in some cases, result in loss of visible details in the image. Such distortion is alleviated by using the tempered exposure adjustments of the examples described above.

While the applications of some embodiments described previously calculate a tempered adjustment to move either the average intensity or the median intensity (the $50^{th}$ percentile intensity) toward a target value, the applications of other embodiments move a different percentile (e.g., the $18^{th}$ percentile) toward a target value.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
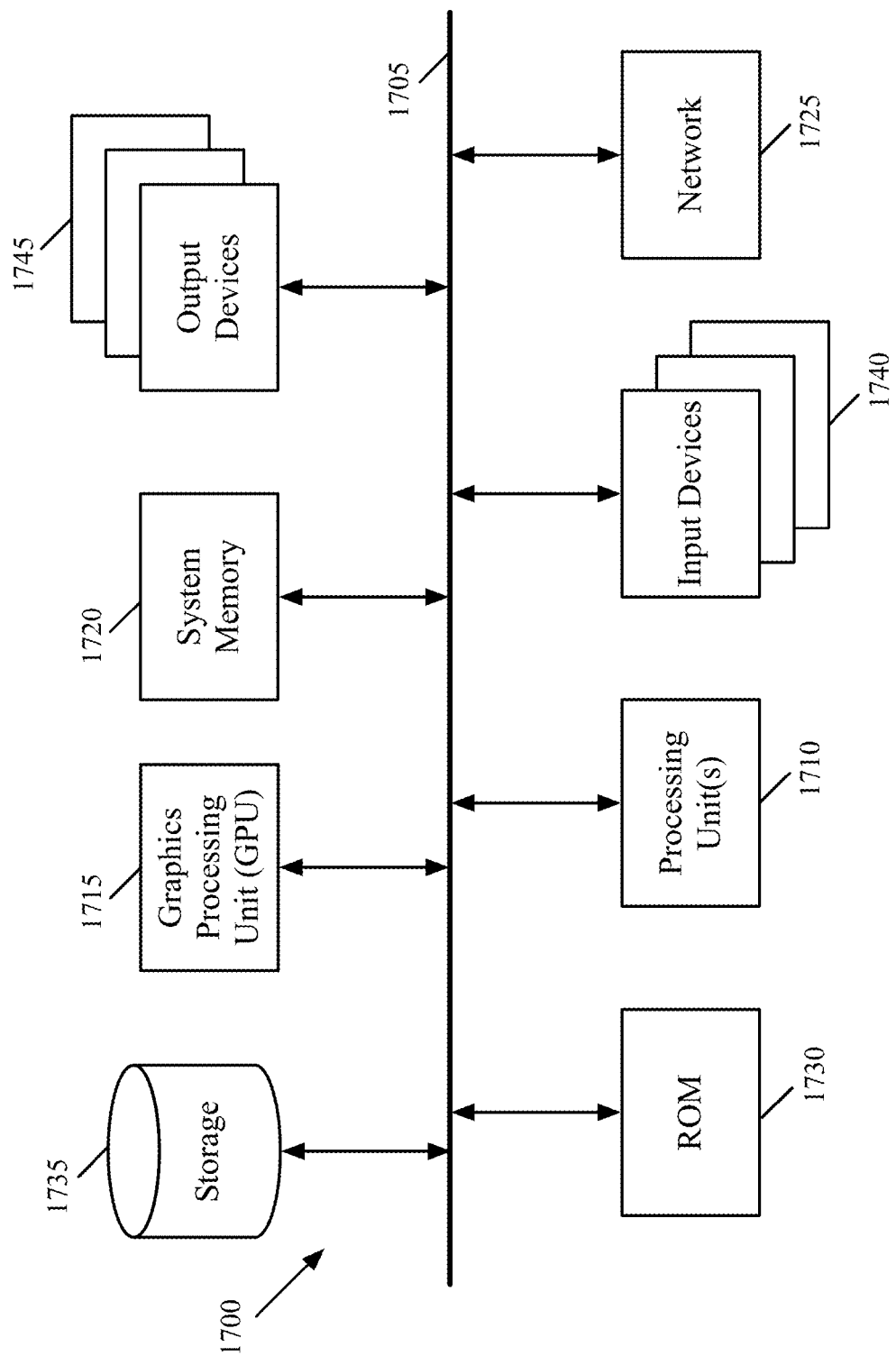
FIG. 17 conceptually illustrates an example of an electronic system with which some embodiments are implemented.

FIG. 17 conceptually illustrates an example of an electronic system 1700 with which some embodiments are implemented. The electronic system 1700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710. In some embodiments, such functionality can be provided using CoreImage's kernel shading language.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments use a mass-storage device (such as a magnetic or optical disk and its corresponding disk drive) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet), or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 1 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. For an image editing application, a method for performing an image editing operation on an image based on a set of image processing operations performed by an image capturing device that captured the image, the method comprising:
　　at the image editing application, receiving an image adjusted by the set of image processing operations performed by the image capturing device, that captured the image, prior to importing the image into the image editing application;
　　identifying a first set of parameters that quantify a first set of adjustments made to the image by the set of image processing operations performed by the image capturing device;
　　computing a second set of parameters that quantify a desired second set of adjustments to the image based on an analysis of the image properties;
　　deriving a third set of parameters by comparing the first and second sets of parameters; and
　　based on the third set of parameters, performing the image editing operation on the image to produce an adjusted image.

2. The method of claim 1, wherein the image is an image of a scene captured by the image capturing device.

3. The method of claim 1, wherein the first set of parameters quantify a set of pixel intensities of the image.

4. The method of claim 1, wherein the set of image processing operations adjust intensity of the image.

5. The method of claim 1, wherein identifying the first set of parameters comprises computing an average luminance of the image.

6. An electronic device comprising:
　　a set of processing units;
　　a non-transitory machine readable medium storing a media editing application for execution by at least one processing unit of the device, the media editing application having a graphical user interface (GUI), the media editing application comprising sets of instructions for:
　　　　receiving input to automatically adjust a parameter of an image displayed in a GUI, the image having an appearance based on an initial value for the parameter;
　　　　comparing the initial value for the parameter to a prespecified target value for the parameter;
　　　　based on a difference between the initial value and the prespecified target value, identifying a tempered target value for the parameter, wherein the tempered target value is specific to the image and different than the prespecified target value;
　　　　automatically adjusting the initial value for the parameter of the image to match the tempered target value rather than the prespecified target value for the parameter; and
　　　　modifying the appearance of the displayed image based on the adjusted value of the parameter.

7. The device of claim 6, wherein the initial value for the parameter is based on a set of image processing operations performed by an image capturing device that captured a scene to produce the image.

8. The device of claim 6, wherein the media editing application further comprises a set of instructions for importing the image into the media editing application, wherein the initial value for the parameter is based on a set of image processing operations performed while importing the image.

9. The device of claim 6, wherein the initial value for the parameter comprises a set of image values based on a histogram of the image.

10. The device of claim 6, wherein the image comprises a plurality of pixels each of which has an associated luminance value, wherein the media editing application further comprises a set of instructions for computing an average luminance of the image based on the luminance values of the pixels.

11. The device of claim 10, wherein the initial value for the parameter comprises the average luminance, the prespecified target value for the parameter comprises a target average luminance, the tempered target value comprises a tempered average luminance based on comparing the computed average luminance to the target average luminance, and automatically adjusting the initial value for the parameter comprises adjusting the computed average luminance to the tempered average luminance.

12. The device of claim 6, wherein the media editing application further comprises a set of instructions for displaying a selectable tool for automatically adjusting the parameter, wherein the set of instructions for receiving input to automatically adjust the parameter comprises a set of instructions for receiving a selection of the tool.

13. A non-transitory machine readable medium storing an image editing application which when executed by at least one processing unit performs an image editing operation on an image based on a set of image processing operations performed by an image capturing device that captured the image, the program comprising sets of instructions for:

at the image editing application, receiving an image adjusted by the set of image processing operations performed by the image capturing device, that captured the image, prior to importing the image into the image editing application;

identifying a first set of parameters that quantify a first set of adjustments made to the image by the set of image processing operations performed by the image capturing device;

computing a second set of parameters that quantify a desired second set of adjustments to the image based on an analysis of the image properties;

deriving a third set of parameters by comparing the first and second sets of parameters; and based on the third set of parameters, performing the image editing operation on the image to produce an adjusted image.

14. The non-transitory machine readable medium of claim 13, wherein the image is an image of a scene captured by the image capturing device.

15. The non-transitory machine readable medium of claim 13, wherein the first set of parameters quantify a set of pixel intensities of the image.

16. The non-transitory machine readable medium of claim 13, wherein the set of image processing operations adjust intensity of the image.

17. The non-transitory machine readable medium of claim 13, wherein the set of instructions for identifying the first set of parameters comprises a set of instructions for computing an average luminance of the image.

18. For a media-editing application having a graphical user interface (GUI), a method comprising:

receiving input to automatically adjust a parameter of an image displayed in a GUI, the image having an appearance based on an initial value for the parameter;

comparing the initial value for the parameter to a prespecified target value for the parameter;

based on a difference between the initial value and the prespecified target value, identifying a tempered target value for the parameter, wherein the tempered target value is specific to the image and different than the prespecified target value;

automatically adjusting the initial value for the parameter of the image to match the tempered target value rather than the prespecified target value for the parameter; and modifying the appearance of the displayed image based on the adjusted value of the parameter.

19. The method of claim 18, wherein the initial value for the parameter is based on a set of image processing operations performed by an image capturing device that captured a scene to produce the image.

20. The method of claim 18 further comprising importing the image into the media editing application, wherein the initial value for the parameter is based on a set of image processing operations performed while importing the image.

21. The method of claim 18, wherein the initial value for the parameter comprises a set of image values based on a histogram of the image.

22. The method of claim 18, wherein the image comprises a plurality of pixels each of which has an associated luminance value, the method further comprising computing an average luminance of the image based on the luminance values of the pixels.

23. The method of claim 22, wherein the initial value for the parameter comprises the average luminance, the prespecified target value for the parameter comprises a target average luminance, the tempered target value comprises a tempered average luminance based on comparing the computed average luminance to the target average luminance, and automatically adjusting the initial value for the comprises adjusting the computed average luminance to the tempered average luminance.

24. The method of claim 18 further comprising displaying a selectable tool for automatically adjusting the parameter, wherein receiving input to automatically adjust the parameter comprises receiving a selection of the tool.

* * * * *